(12) United States Patent
Bae

(10) Patent No.: US 9,395,900 B2
(45) Date of Patent: Jul. 19, 2016

(54) MOBILE TERMINAL AND METHOD OF MOVING AN ICON FROM A PAGE DISPLAYED ON THE MOBILE TERMINAL TO ANOTHER PAGE

(75) Inventor: Donghee Bae, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 256 days.

(21) Appl. No.: 13/029,513

(22) Filed: Feb. 17, 2011

(65) Prior Publication Data

US 2012/0084692 A1    Apr. 5, 2012

(30) Foreign Application Priority Data

Sep. 30, 2010  (KR) .................. 10-2010-0095072

(51) Int. Cl.
*G06F 3/0488* (2013.01)
*G06F 3/0486* (2013.01)
*G06F 3/0483* (2013.01)
*G06F 3/0481* (2013.01)

(52) U.S. Cl.
CPC .......... *G06F 3/0488* (2013.01); *G06F 3/0483* (2013.01); *G06F 3/0486* (2013.01); *G06F 3/04817* (2013.01)

(58) Field of Classification Search
CPC ... G06F 3/0483; G06F 3/0486; G06F 3/0488; G06F 3/04817
USPC .......... 715/769, 835, 837, 865, 810
See application file for complete search history.

(56) References Cited

U.S. PATENT DOCUMENTS

| | | | |
|---|---|---|---|
| 5,680,262 A | 10/1997 | Soliday et al. | |
| 5,754,179 A * | 5/1998 | Hocker et al. | 715/835 |
| 2002/0060701 A1 * | 5/2002 | Naughton et al. | 345/853 |
| 2006/0161847 A1 * | 7/2006 | Holecek et al. | 715/716 |
| 2007/0157089 A1 * | 7/2007 | Van Os et al. | 715/702 |
| 2007/0157097 A1 * | 7/2007 | Peters | 715/764 |
| 2007/0240047 A1 * | 10/2007 | Kosov et al. | 715/700 |
| 2008/0034318 A1 | 2/2008 | Louch et al. | |
| 2009/0058821 A1 | 3/2009 | Chaudhri et al. | |
| 2009/0064055 A1 | 3/2009 | Chaudhri et al. | |
| 2010/0013761 A1 * | 1/2010 | Birnbaum et al. | 345/156 |
| 2010/0257059 A1 * | 10/2010 | Fujioka et al. | 705/14.66 |

(Continued)

FOREIGN PATENT DOCUMENTS

| | | |
|---|---|---|
| CN | 101308443 | 11/2008 |
| CN | 101727282 | 6/2010 |
| CN | 101833416 | 9/2010 |

OTHER PUBLICATIONS

The State Intellectual Property Office of the People's Republic of China Application Serial No. 201110085589.6, Office Action dated Dec. 31, 2013, 13 pages.

(Continued)

*Primary Examiner* — Aaron Lowenberger

(74) *Attorney, Agent, or Firm* — Lee, Hong, Degerman, Kang & Waimey; Jonathan Kang; Richard Salfelder

(57) ABSTRACT

A mobile terminal is disclosed. The mobile terminal may include a touch screen configured to display a specific page a plurality of pages including at least one icon and a controller configured to move a specific icon displayed on the specific page to a page corresponding to a specific indicator a plurality of indicators when a predetermined user manipulation for selecting the specific indicator is detected, the plurality of pages having indicators corresponding the pages respectively.

20 Claims, 25 Drawing Sheets

(56) References Cited

U.S. PATENT DOCUMENTS

2011/0087534 A1* 4/2011 Strebinger et al. ......... 705/14.25
2011/0138275 A1* 6/2011 Yu ................................. 715/702
2011/0271182 A1* 11/2011 Tsai et al. ..................... 715/702

OTHER PUBLICATIONS

European Patent Office Application Serial No. 11007812.8, Search Report dated Apr. 11, 2014, 9 pages.

* cited by examiner

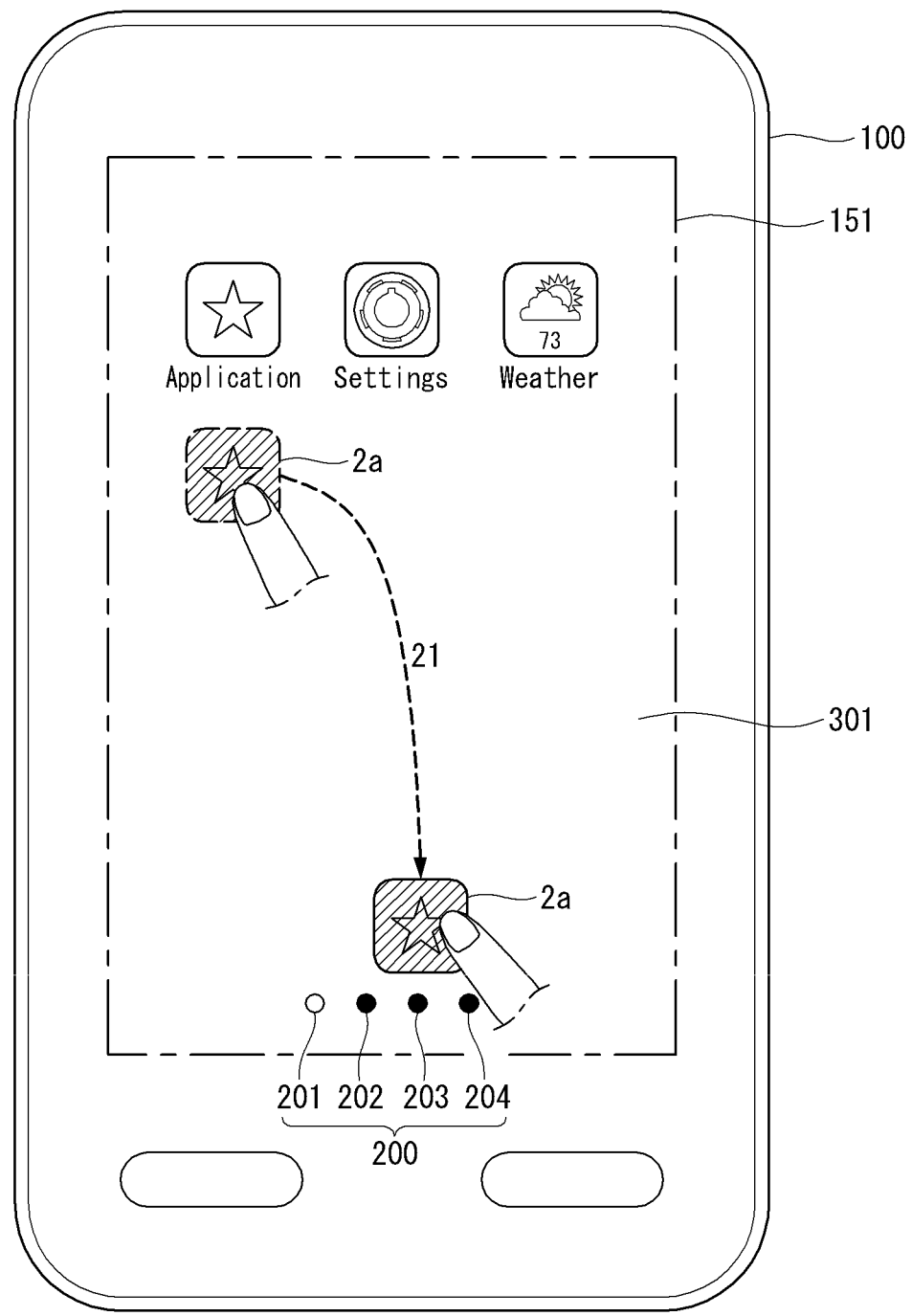

S130

FIG. 9
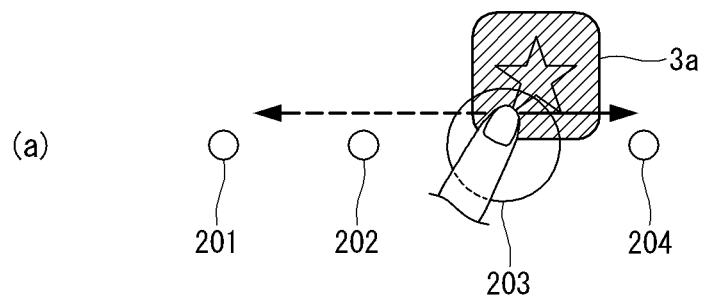
(a)
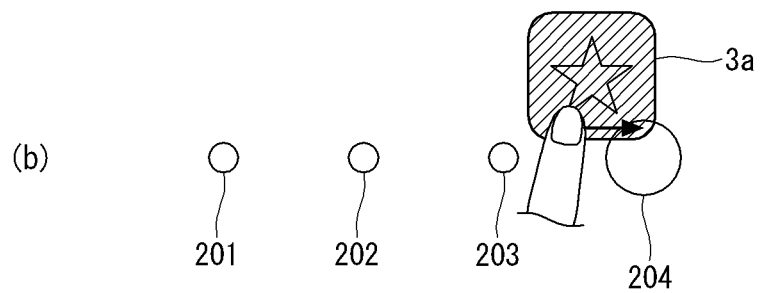
(b)
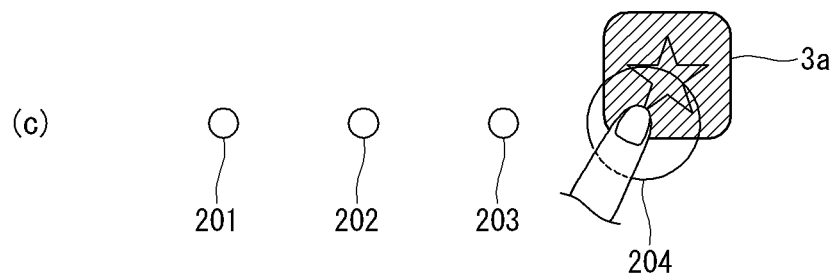
(c)

S111

S112

S114

S115

S116

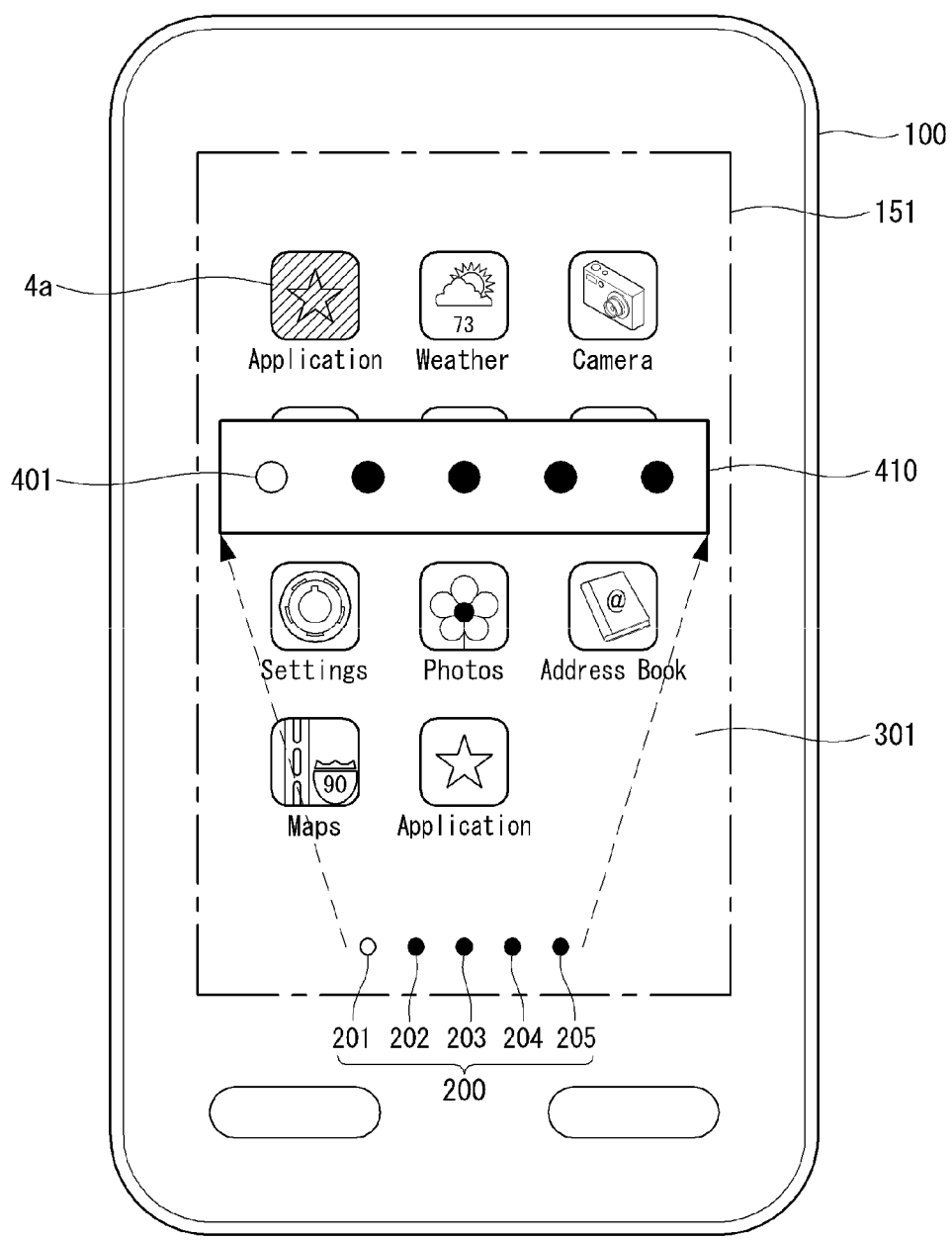

MOBILE TERMINAL AND METHOD OF MOVING AN ICON FROM A PAGE DISPLAYED ON THE MOBILE TERMINAL TO ANOTHER PAGE

CROSS-REFERENCE TO RELATED APPLICATIONS

Pursuant to 35 U.S.C. §119(a), this application claims the benefit of earlier filing date and right of priority to Korean Patent Application No. 10-2010-0095072, filed on Sep. 30, 2010, the contents of which is hereby incorporated by reference herein in its entirety.

BACKGROUND

1. Field

This document relates to a mobile terminal and a control method thereof.

2. Related Art

Mobile terminals use user interface elements capable of interacting with users in these days. A variety of functions (software) executed through a mobile terminal can be provided as a program through the user interface element. Graphical objects as a representative of the user interface elements can be used to improve the visibility and accessibility of mobile terminal users.

Accordingly, techniques capable of effectively managing various graphical objects on the mobile terminal to improve the usability of the mobile terminal are required.

SUMMARY

According to a mobile terminal and a control method thereof according to embodiments of this document, icons displayed on a touch screen can be efficiently managed.

Furthermore, pages of the icons displayed on the touch screen can be efficiently moved.

Moreover, predetermined icons can be moved to desired pages by using a page indicator without sequentially moving the icons to the pages displayed on the touch screen.

In addition, the usability of the mobile terminal can be improved through the aforementioned effects.

BRIEF DESCRIPTION OF THE DRAWINGS

The implementation of this document will be described in detail with reference to the following drawings in which like numerals refer to like elements.

FIGS. 7A, 7B, 7C and 7D are drawings for explaining the control method of the mobile terminal, shown in FIG. 6;

FIG. 9 is a drawing illustrating changes in the visual appearances of page indicators during a page search;

FIG. 13 is a drawing illustrating an example of page indicators displayed on a touch screen.

DETAILED DESCRIPTION

This document will now be described more fully with reference to the accompanying drawings, in which exemplary embodiments of this document are shown. This document may, however, be embodied in many different forms and should not be construed as being limited to the embodiments set forth herein; rather, there embodiments are provided so that this disclosure will be thorough and complete, and will fully convey the concept of this document to those skilled in the art.

Hereinafter, a mobile terminal relating to this document will be described below in more detail with reference to the accompanying drawings. In the following description, suffixes "module" and "unit" are given to components of the mobile terminal in consideration of only facilitation of description and do not have meanings or functions discriminated from each other.

The mobile terminal described in the specification can include a cellular phone, a smart phone, a laptop computer, a digital broadcasting terminal, personal digital assistants (PDA), a portable multimedia player (PMP), a navigation system, and so on.

Figure 1:
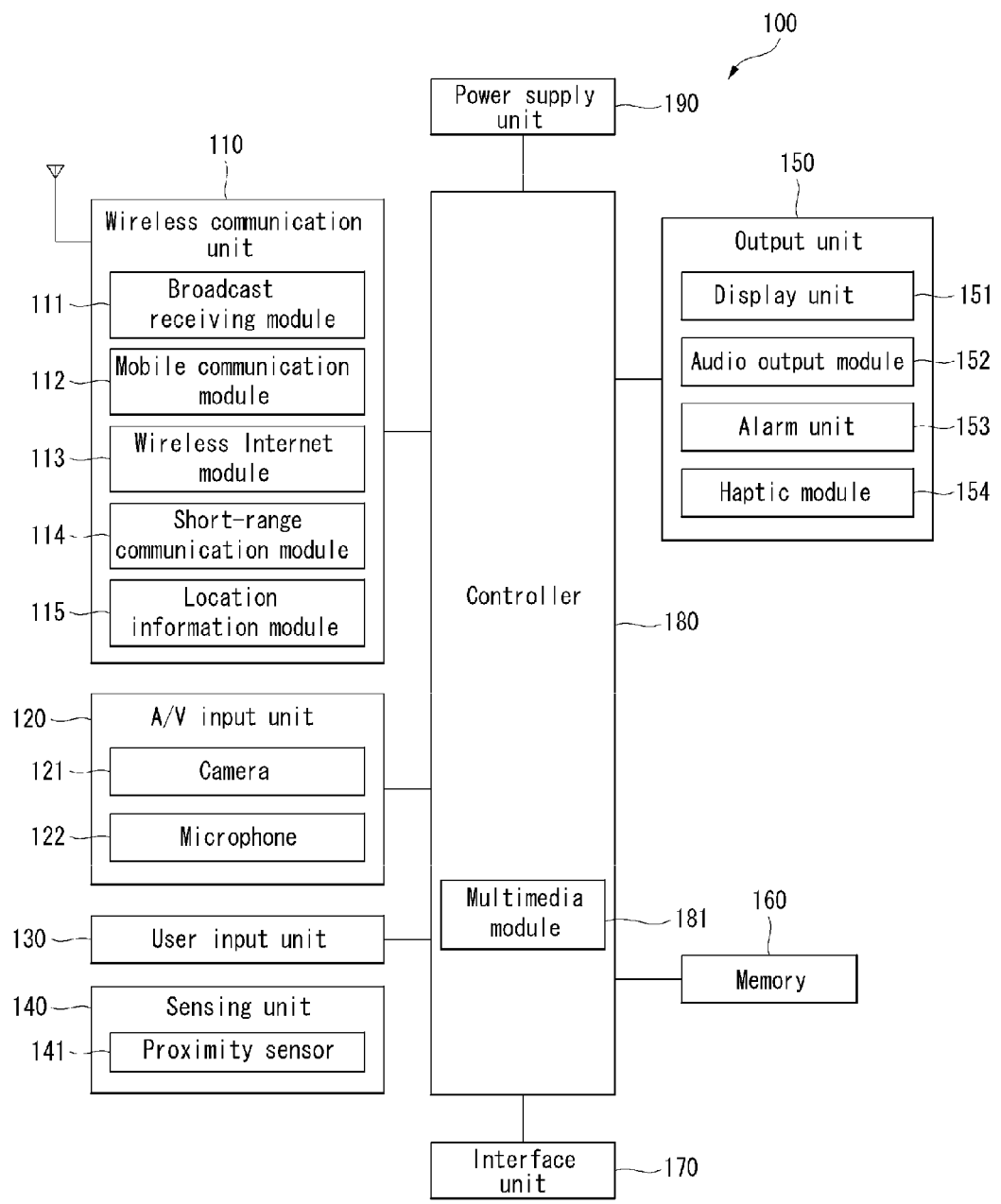
FIG. 1 is a block diagram of a mobile terminal according to an embodiment of this document.

FIG. 1 is a block diagram of a mobile terminal 100 according to an embodiment of this document. The mobile terminal 100 can include a radio communication unit 110, an audio/video (A/V) input unit 120, a user input unit 130, a sensing unit 140, an output unit 150, a memory 160, an interface 170, a controller 180, and a power supply 190. The components shown in FIG. 1 are not essential parts and the number of components included in the mobile terminal can be varied.

The components of the mobile terminal will now be described.

The radio communication unit 110 can include at least one module that enables radio communication between the mobile terminal 100 and a radio communication system or between the mobile terminal 100 and a network in which the mobile terminal 100 is located. For example, the radio communication unit 110 can include a broadcasting receiving module 111, a mobile communication module 112, a wireless Internet module 113, a short-range communication module 114 and a position information module 115.

The broadcasting receiving module 111 receives broadcasting signals and/or broadcasting related information from an external broadcasting management server through a broadcasting channel.

The broadcasting channel can include a satellite channel and a terrestrial channel. The broadcasting management server can be a server that generates and transmits broadcasting signals and/or broadcasting related information or a server that receives previously created broadcasting signals and/or broadcasting related information and transmits the broadcasting signals and/or broadcasting related information to a terminal. The broadcasting signals can include not only TV broadcasting signals, radio broadcasting signals and data broadcasting signals but also signals in the form of combination of a TV broadcasting signal and a radio broadcasting signal.

The broadcasting related information can be information on a broadcasting channel, a broadcasting program or a broadcasting service provider. The broadcasting related information can be provided even through a mobile communication network. In this case, the broadcasting related information can be received by the mobile communication module 112.

The broadcasting related information can exist in various forms. For example, the broadcasting related information can exist in the form of electronic program guide (EPG) of digital multimedia broadcasting (DMB) or in the form of electronic service guide (ESG) of digital video broadcast-handheld (DVB-H).

The broadcasting receiving module 111 receives broadcasting signals using various broadcasting systems. Particularly, the broadcasting receiving module 111 can receive digital broadcasting signals using digital broadcasting systems such as digital multimedia broadcasting-terrestrial (DMB-T), digital multimedia broadcasting-satellite (DMB-S), media forward link only (MediaFLO), DVB-H and integrated services digital broadcast-terrestrial (ISDB-T) systems. The broadcasting receiving module 111 can be constructed to be suited to broadcasting systems providing broadcasting signals other than the above-described digital broadcasting systems.

The broadcasting signals and/or broadcasting related information received through the broadcasting receiving module 111 can be stored in the memory 160.

The mobile communication module 112 transmits/receives a radio signal to/from at least one of a base station, an external terminal and a server on a mobile communication network. The radio signal can include a voice call signal, a video telephony call signal or data in various forms according to transmission and receiving of text/multimedia messages.

The wireless Internet module 113 means a module for wireless Internet access and can be included in the mobile terminal 100 or externally attached to the mobile terminal 100. Wireless LAN (WLAN) (Wi-Fi), wireless broadband (Wibro), world interoperability for microwave access (Wimax), high speed downlink packet access (HSDPA) and so on can be used as a wireless Internet technique.

The short-range communication module 114 means a module for near field communication. Bluetooth, radio frequency identification (RFID), infrared data association (IrDA), ultra wideband (UWB) and ZigBee can be used as a near field communication technique.

The position information module 115 confirms or obtains the position of the mobile terminal. A global positioning system (GPS) module is a representative example of the position information module 115. According to the current technology, the GPS module 115 can calculate information on distances between one point (object) and at least three satellites and information on the time when the distance information is measured and apply trigonometry to the obtained distance information to obtain three-dimensional position information on the point (object) according to latitude, longitude and altitude at a predetermined time. Furthermore, a method of calculating position and time information using three satellites and correcting the calculated position and time information using another satellite is also used. In addition, the GPS module 115 continuously calculates the current position in real time and calculates velocity information using the position information.

Referring to FIG. 1, the A/V input unit 120 is used to input an audio signal or a video signal and can include a camera 121 and a microphone 122. The camera 121 processes image frames of still images or moving images obtained by an image sensor in a video telephony mode or a photographing mode. The processed image frames can be displayed on a display unit 151.

The image frames processed by the camera 121 can be stored in the memory 160 or transmitted to an external device through the radio communication unit 110. The mobile terminal 100 can include at least two cameras according to constitution of the terminal.

The microphone 122 receives an external audio signal in a call mode, a recording mode or a speed recognition mode and processes the received audio signal into electric audio data. The audio data can be converted into a form that can be transmitted to a mobile communication base station through the mobile communication module 112 and output in the call mode. The microphone 122 can employ various noise removal algorithms for removing noise generated when the external audio signal is received.

The user input unit 130 receives input data for controlling the operation of the terminal from a user. The user input unit 130 can include a keypad, a dome switch, a touch pad (constant voltage/capacitance), jog wheel, jog switch and so on.

The sensing unit 140 senses the current state of the mobile terminal 100, such as open/close state of the mobile terminal 100, the position of the mobile terminal 100, whether a user touches the mobile terminal 100, the direction of the mobile terminal 100 and acceleration/deceleration of the mobile terminal 100 and generates a sensing signal for controlling the operation of the mobile terminal 100. For example, the sensing unit 140 can sense whether a slide phone is opened or closed when the mobile terminal 100 is the slide phone. Furthermore, the sensing unit 140 can sense whether the power supply 190 supplies power and whether the interface 170 is connected to an external device. The sensing unit 140 can include a proximity sensor.

The output unit 150 generates visual, auditory or tactile output and can include the display unit 151, an audio output module 152, an alarm 153 and a haptic module 154.

The display unit 151 displays information processed by the mobile terminal 100. For example, the display unit 151 displays UI or graphic user interface (GUI) related to a telephone call when the mobile terminal is in the call mode. The display unit 151 displays a captured or/and received image, UI or GUI when the mobile terminal 100 is in the video telephony mode or the photographing mode.

The display unit 151 can include at least one of a liquid crystal display, a thin film transistor liquid crystal display, an organic light-emitting diode display, a flexible display and a three-dimensional display.

Some of these displays can be of a transparent type or a light transmission type. This can be referred to as a transparent display. The transparent display includes a transparent liquid crystal display. The rear structure of the display unit 151 can also be of the light transmission type. According to this structure, a user can see an object located behind the body of the mobile terminal 100 through an area of the body of the mobile terminal 100, which is occupied by the display unit 151.

The mobile terminal 100 can include at least two display units 151 according to constitution of the terminal. For example, the mobile terminal 100 can include a plurality of displays that are arranged on a single face at a predetermined distance or integrated. Otherwise, the plurality of displays can be arranged on different sides.

In the case where the display unit 151 and a sensor sensing touch (referred to as a touch sensor hereinafter) form a layered structure, which is referred to as a touch screen hereinafter, the display unit 151 can be used as an input device in addition to an output device. The touch sensor can be in the form of a touch film, a touch sheet and a touch pad, for example.

The touch sensor can be constructed such that it converts a variation in pressure applied to a specific portion of the display unit 151 or a variation in capacitance generated at a specific portion of the display unit 151 into an electric input signal. The touch sensor can be constructed such that it can sense pressure of touch as well as the position and area of touch.

When touch input is applied to the touch sensor, a signal corresponding to the touch input is transmitted to a touch controller. The touch controller processes the signal and transmits data corresponding to the processed signal to the controller 180. Accordingly, the controller 180 can detect a touched portion of the display 151.

Referring to FIG. 1, the proximity sensor 141 can be located in an internal region of the mobile terminal, surrounded by the touch screen, or near the touch screen. The proximity sensor senses an object approaching a predetermined sensing face or an object located near the proximity sensor using electromagnetic force or infrared rays without having mechanical contact. The proximity sensor has lifetime longer than that of a contact sensor and has wide application.

The proximity sensor includes a transmission type photo-electric sensor, a direct reflection type photo-electric sensor, a mirror reflection type photo-electric sensor, a high-frequency oscillating proximity sensor, a capacitive proximity sensor, a magnetic proximity sensor, an infrared proximity sensor, etc.

A capacitive touch screen is constructed such that proximity of a pointer is detected through a variation in an electric field according to the proximity of the pointer. In this case, the touch screen (touch sensor) can be classified as a proximity sensor.

For convenience of explanation, an action of approaching the pointer to the touch screen while the pointer it not being in contact with the touch screen such that location of the pointer on the touch screen is recognized is referred to as "proximity touch" and an action of bring the pointer into contact with the touch screen is referred to as "contact touch" in the following description. A proximity touch point of the pointer on the touch screen means a point of the touch screen to which the pointer corresponds perpendicularly to the touch screen when the pointer proximity-touches the touch screen.

The proximity sensor senses proximity touch and a proximity touch pattern (for example, a proximity touch distance, a proximity touch direction, a proximity touch velocity, a proximity touch time, a proximity touch position, a proximity touch moving state, etc.). Information corresponding to the sensed proximity touch action and proximity touch pattern can be displayed on the touch screen.

The audio output module 152 can output audio data received from the radio communication unit 110 or stored in the memory 160 in a call signal receiving mode, a telephone call mode or a recording mode, a speech recognition mode and a broadcasting receiving mode. The audio output module 152 outputs audio signals related to functions (for example, a call signal incoming tone, a message incoming tone, etc.) performed in the mobile terminal 100. The audio output module 152 can include a receiver, a speaker, a buzzer, etc.

The alarm 153 outputs a signal for indicating generation of an event of the mobile terminal 100. Examples of events generated in the mobile terminal include receiving of a call signal, receiving of a message, input of a key signal, input of touch, etc. The alarm 153 can output signals in forms different from video signals or audio signals, for example, a signal for indicating generation of an event through vibration. The video signals or the audio signals can be also output through the display unit 151 or the audio output module 152.

The haptic module 154 generates various haptic effects that the user can feel. A representative example of the haptic effects is vibration. The intensity and pattern of vibration generated by the haptic module 154 can be controlled. For example, different vibrations can be combined and output or sequentially output.

The haptic module 154 can generate a variety of haptic effects including an effect of stimulus according to arrangement of pins vertically moving for a contact skin face, an effect of stimulus according to jet force or sucking force of air through a jet hole or a sucking hole, an effect of stimulus rubbing the skin, an effect of stimulus according to contact of an electrode, an effect of stimulus using electrostatic force and an effect according to reproduction of cold and warmth using an element capable of absorbing or radiating heat in addition to vibrations.

The haptic module 154 can not only transmit haptic effects through direct contact but also allow the user to feel haptic effects through kinesthetic sense of his fingers or arms. The mobile terminal 100 can include at least two haptic modules 154 according to constitution of the mobile terminal.

The memory 160 can store a program for the operation of the controller 180 and temporarily store input/output data (for example, phone book, messages, still images, moving images, etc.). The memory 160 can store data about vibrations and sounds in various patterns, which are output from when a touch input is applied to the touch screen.

The memory 160 can include at least one of a flash memory, a hard disk type memory, a multimedia card micro type memory, a card type memory (for example, SD or XD memory), a random access memory (RAM), a static RAM (SRAM), a read-only memory (ROM), an electrically erasable programmable ROM (EEPROM), a programmable ROM (PROM) magnetic memory, a magnetic disk and an optical disk. The mobile terminal 100 can operate in relation to a web storage performing the storing function of the memory 160 on the Internet.

The interface 170 serves as a path to all external devices connected to the mobile terminal 100. The interface 170 receives data from the external devices or power and transmits the data or power to the internal components of the mobile terminal 100 or transmits data of the mobile terminal 100 to the external devices. The interface 170 can include a wired/wireless headset port, an external charger port, a wired/wireless data port, a memory card port, a port for connecting a device having a user identification module, an audio I/O port, a video I/O port, an earphone port, etc., for example.

An identification module is a chip that stores information for authenticating the authority to use the mobile terminal 100 and can include a user identify module (UIM), a subscriber identify module (SIM) and a universal subscriber identify module (USIM). A device (referred to as an identification device hereinafter) including the identification module can be manufactured in the form of a smart card. Accordingly, the identification device can be connected to the mobile terminal 100 through a port.

The interface 170 can serve as a path through which power from an external cradle is provided to the mobile terminal 100 when the mobile terminal 100 is connected to the external cradle or a path through which various command signals inputted by the user through the cradle to the mobile terminal 100. The various command signals or power input from the cradle can be used as a signal for confirming whether the mobile terminal 100 is correctly set in the cradle.

The controller 180 controls the overall operation of the mobile terminal. For example, the controller 180 performs control and processing for voice communication, data communication and video telephony. The controller 180 can include a multimedia module 181 for playing multimedia. The multimedia module 181 can be included in the controller 180 or separated from the controller 180.

The controller 180 can perform a pattern recognition process capable of recognizing handwriting input or picture-drawing input applied to the touch screen as characters or images.

The power supply 190 receives external power and internal power and provides power required for the operations of the components of the mobile terminal under the control of the controller 180.

Various embodiments of the present invention can be implemented in a computer or similar device readable recording medium using software, hardware or a combination thereof, for example.

According to hardware implementation, the embodiments of the present invention can be implemented using at least one of application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, electrical units for executing functions. In some cases, the embodiments can be implemented by the controller 180.

According to software implementation, embodiments such as procedures or functions can be implemented with a separate software module executing at least one function or operation. Software codes can be implemented according to a software application written in an appropriate software language. Furthermore, the software codes can be stored in the memory 160 and executed by the controller 180.

Figure 2A:
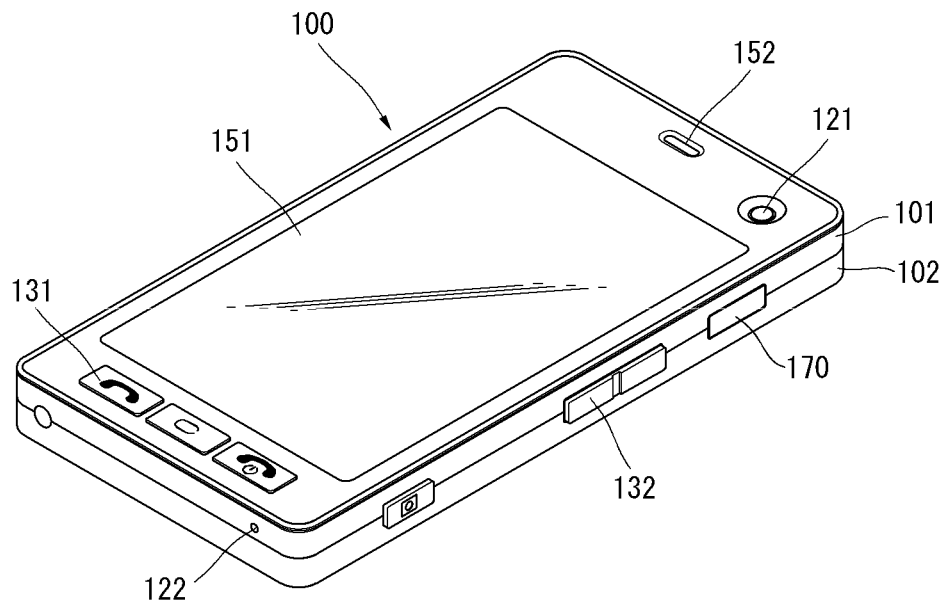
FIGS. 2A and 2B are drawings illustrating forms of the mobile terminal and display screens according to various embodiments of this document.

FIG. 2A is a front perspective view of a mobile terminal or a handheld terminal 100 according to an embodiment of the present invention.

The handheld terminal 100 has a bar type terminal body. However, the present invention is not limited to a bar type terminal and can be applied to terminals of various types including slide type, folder type, swing type and swivel type terminals having at least two bodies that are relatively movably combined.

The terminal body includes a case (a casing, a housing, a cover, etc.) forming the exterior of the terminal 100. In the present embodiment, the case can be divided into a front case 101 and a rear case 102. Various electronic components are arranged in the space formed between the front case 101 and the rear case 102. At least one middle case can be additionally arranged between the front case 101 and the rear case 102.

The cases can be formed of plastics through injection molding or made of a metal material such as stainless steel (STS) or titanium (Ti).

The display unit 151, the audio output unit 152, the camera 121, the user input unit 130/131 and 132, the microphone 122 and the interface 170 can be arranged in the terminal body, specifically, in the front case 101.

The display unit 151 occupies most part of the main face of the front case 101. The audio output unit 152 and the camera 121 are arranged in a region in proximity to one of both ends of the display unit 151 and the user input unit 131 and the microphone 122 are located in a region in proximity to the other end of the display unit 151. The user input unit 132 and the interface 170 are arranged on the sides of the front case 101 and the rear case 102.

The user input unit 130 is operated to receive commands for controlling the operation of the handheld terminal 100 and can include a plurality of operating units 131 and 132. The operating units 131 and 132 can be referred to as manipulating portions and employ any tactile manner in which a user operates the operating units 131 and 132 while having tactile feeling.

First and second operating units 131 and 132 can receive various inputs. For example, the first operating unit 131 receives commands such as start, end and scroll and the second operating unit 132 receives commands such as control of the volume of sound output from the audio output unit 152 or conversion of the display unit 151 to a touch recognition mode.

Figure 2B:
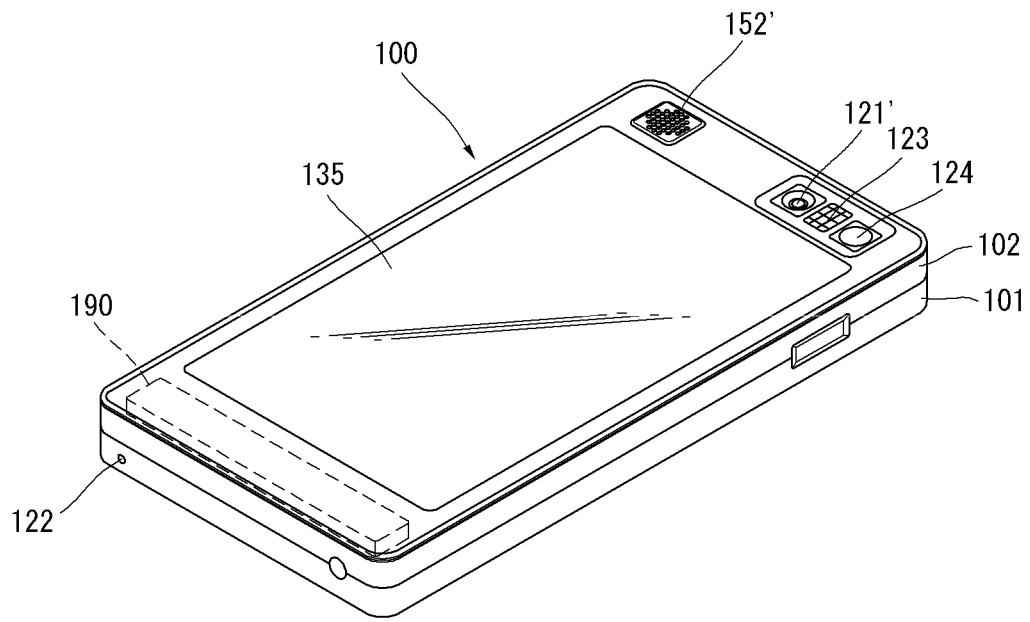

FIG. 2B is a rear perspective view of the handheld terminal shown in FIG. 2A according to an embodiment of the present invention.

Referring to FIG. 2A, a camera 121' can be additionally attached to the rear side of the terminal body, that is, the rear case 102. The camera 121' has a photographing direction opposite to that of the camera 121 shown in FIG. 2A and can have pixels different from those of the camera 121 shown in FIG. 2A.

For example, it is desirable that the camera 121 has low pixels such that it can capture an image of the face of a user and transmit the image to a receiving part in case of video telephony while the camera 121' has high pixels because it captures an image of a general object and does not immediately transmit the image in many cases. The cameras 121 and 121' can be attached to the terminal body such that they can be rotated or pop-up.

A flash bulb 123 and a mirror 124 are additionally arranged in proximity to the camera 121'. The flash bulb 123 lights an object when the camera 121' takes a picture of the object. The mirror 124 is used for the user to look at his/her face in the mirror when the user wants to self-photograph himself/herself using the camera 121'.

An audio output unit 152' can be additionally provided on the rear side of the terminal body. The audio output unit 152' can achieve a stereo function with the audio output unit 152 shown in FIG. 2A and be used for a speaker phone mode when the terminal is used for a telephone call.

A broadcasting signal receiving antenna can be additionally attached to the side of the terminal body in addition to an antenna for telephone calls. The antenna constructing a part of the broadcasting receiving module 111 shown in FIG. 1 can be set in the terminal body such that the antenna can be pulled out of the terminal body.

The power supply 190 for providing power to the handheld terminal 100 is set in the terminal body. The power supply 190 can be included in the terminal body or detachably attached to the terminal body.

A touch pad 135 for sensing touch can be additionally attached to the rear case 102. The touch pad 135 can be of a light transmission type as the display unit 151. In this case, if the display unit 151 outputs visual information through both sides thereof, the visual information can be recognized through the touch pad 135. The information output through both sides of the display unit 151 can be controlled by the touch pad 135. Otherwise, a display is additionally attached to the touch pad 135 such that a touch screen can be arranged even in the rear case 102.

The touch pad 135 operates in connection with the display unit 151 of the front case 101. The touch pad 135 can be located in parallel with the display unit 151 behind the display unit 151. The touch panel 135 can be identical to or smaller than the display unit 151 in size.

Figure 3:
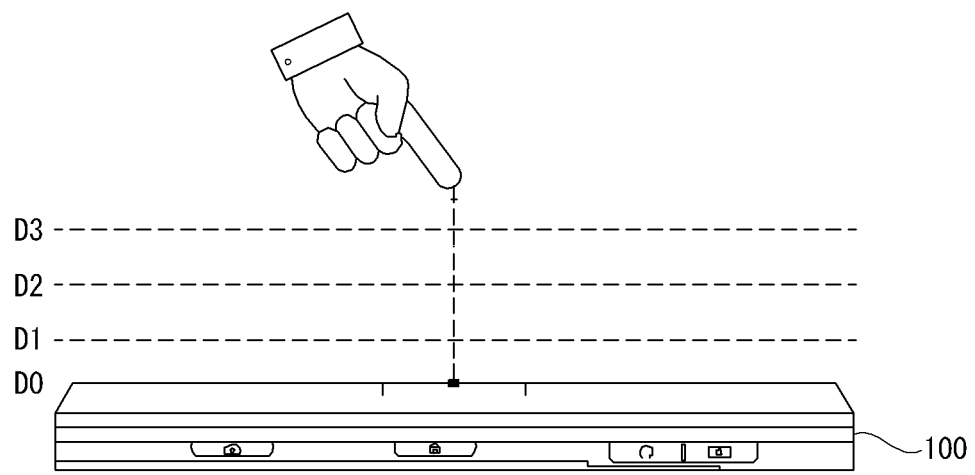
FIG. 3 is a conceptional drawing explaining a proximity depth of a proximity sensor.

FIG. 3 is a conceptional drawing for explaining a proximity depth of the proximity sensor.

As shown in FIG. 3, when a pointer such as a user's finger approaches the touch screen, the proximity sensor located inside or near the touch screen senses the approach and outputs a proximity signal.

The proximity sensor can be constructed such that it outputs a proximity signal according to the distance between the pointer approaching the touch screen and the touch screen (referred to as "proximity depth").

The distance in which the proximity signal is output when the pointer approaches the touch screen is referred to as a detection distance. The proximity depth can be known by using a plurality of proximity sensors having different detection distances and comparing proximity signals respectively output from the proximity sensors.

FIG. 3 shows the section of the touch screen in which proximity sensors capable of sensing three proximity depths are arranged. Proximity sensors capable of sensing less than three or more than four proximity depths can be arranged in the touch screen.

Specifically, when the pointer completely comes into contact with the touch screen (D0), it is recognized as contact touch. When the pointer is located within a distance D1 from the touch screen, it is recognized as proximity touch of a first proximity depth. When the pointer is located in a range between the distance D1 and a distance D2 from the touch screen, it is recognized as proximity touch of a second proximity depth. When the pointer is located in a range between the distance D2 and a distance D3 from the touch screen, it is recognized as proximity touch of a third proximity depth. When the pointer is located at longer than the distance D3 from the touch screen, it is recognized as cancellation of proximity touch.

Accordingly, the controller 180 can recognize the proximity touch as various input signals according to the proximity distance and proximity position of the pointer with respect to the touch screen and perform various operation controls according to the input signals.

The general operation and functions of the mobile terminal 100 have been described with reference to FIGS. 1, 2 and 3. An operation and functions of the mobile terminal 100 to move a specific icon to a desired page will now be explained in detail.

The display unit 151 of the mobile terminal 100 may display pages on which at least one icon is displayed. The display unit 151 may be a touch screen. The following description is made on the assumption that the display unit 151 is a touch screen.

Since the touch screen 151 of the mobile terminal 100 has a limited size, the controller 180 may arrange multiple icons on multiple pages to configure pages according to setting of the user so as to display the icons on the touch screen 151 and store page configuration information in the memory 160.

Here, the controller 180 may store the pages in the memory 160 in a specific order and display the page configuration information on the touch screen 151 in the specific order when the user requests the mobile terminal 100 to display the pages.

For example, when the touch screen 151 receives a touch input of flicking the touch screen 151 to the left while the first page is displayed on the touch screen 151, the controller 180 can retrieve second page configuration information from the memory 160 and display the second page configuration information on the touch screen 151. That is, the mobile terminal 100 can display a specific page on the touch screen 151 when the user flicks the touch screen 151 to the left or right. Similarly, a predetermined user manipulation is required to move a specific icon displayed on the touch screen 151 to a specific page.

Figure 4A:
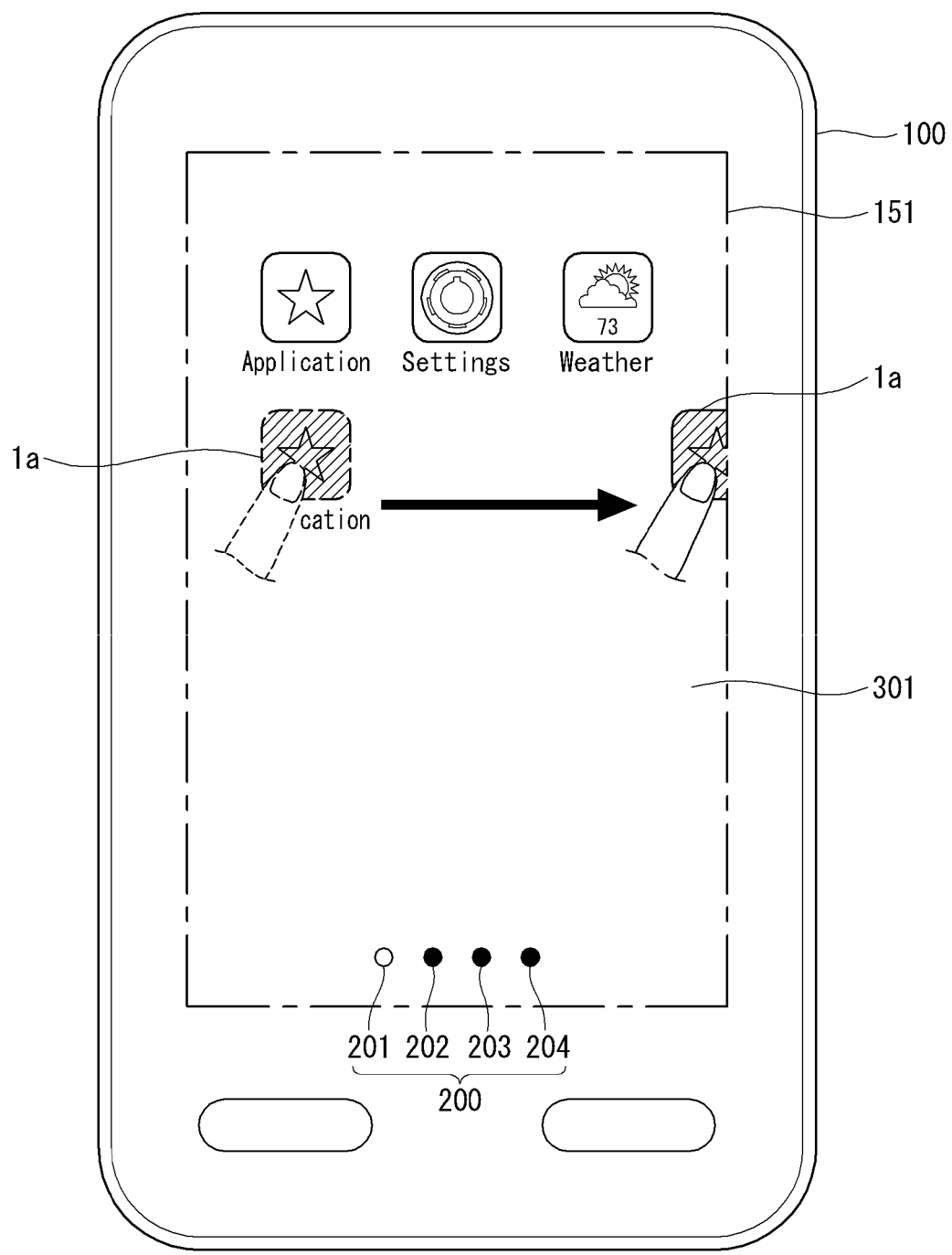
FIGS. 4A and 4B is a drawing illustrating an implementation of moving a specific icon on a specific page displayed on the mobile terminal to a predetermined page.
Figure 4B:
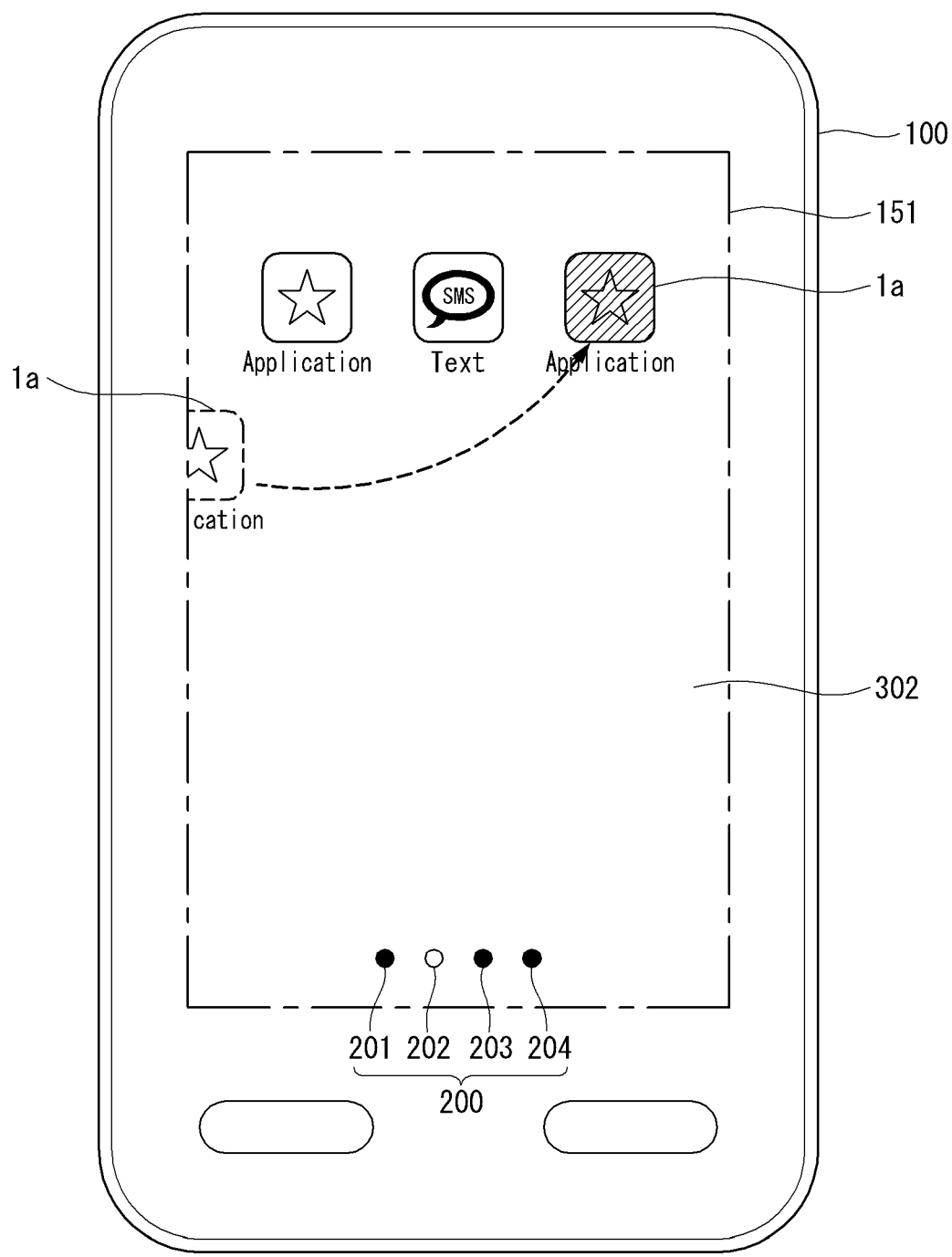

FIGS. 4A and 4B are a drawing illustrating an implementation of moving a specific icon 1a on a specific page displayed on the mobile terminal 100.

Referring to FIGS. 4A and 4B, to move the specific icon 1a displayed on the specific page, a specific user manipulation of dragging the specific icon 1a to a target page (refer to FIG. 4A) and then dropping the specific icon 1a on the target page (refer to FIG. 4B) is required.

For example, the controller 180 can select the specific icon 1a in response to an input touch and display a page 302 following the current page 301 on the touch screen 151 in response to a touch of moving the specific icon 1a to the right edge of the current page 301, for example, a touch-and-move or a drag (refer to FIG. 4A). Here, the controller 180 can retrieve page information about the page 302 from the memory 160 and display the page information on the touch screen 151. The page information stored in the memory 160 may include information representing that a specific icon (including a graphical object) is located at a specific position of a specific page.

The controller 180 may display a page indicator 200 to discriminate pages displayed on the touch screen 151. The page indicator 200 may be composed of page indicators 201, 202, 203 and 204 respectively corresponding to pages.

Referring to FIG. 4A, the page indicator 201 at the very left may correspond to the current page 301. Otherwise, the page indicator 201 may correspond to a first page on the touch screen 151. The page indicator 201 corresponding to the current page 301 may be displayed as an icon in a specific figure which is opened or in a bright color (for example, white), as shown in FIG. 4A. Other page indicators 202, 203 and 204 may be displayed as an icon in the specific figure in a dark color (for example, black).

When a drag input for moving the specific icon 1a to the right edge of the page 301 is received, the controller 180 may move the specific icon 1a to an arbitrary position or a predetermined position of the page 302, as shown in FIG. 4B. In this case, the controller 180 may change the color of the icon of the page indicator 201 to the dark color and change the color of the icon of the page indicator 202 to the bright color.

Figure 5:
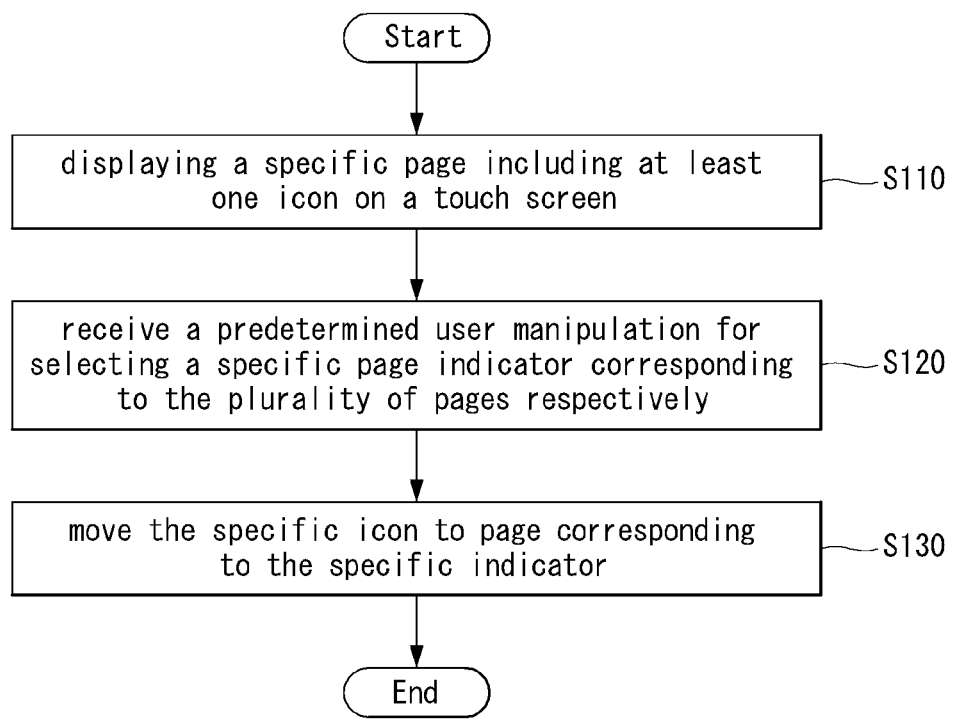
FIG. 5 is a flowchart illustrating a control method of the mobile terminal according to an embodiment of this document.

FIG. 5 is a flowchart illustrating a control method of the mobile terminal 100 according to an embodiment of this document.

Referring to FIGS. 1 and 5, In S110, the mobile terminal 100 may display a specific page of a plurality of pages including at least one icon on the touch screen 151.

The specific icon may be an icon used to execute the function of a specific application. The specific application may be a browser, address book, phone number list, email, instant messaging, word processing, keyboard emulation or widget. However, the application is not limited thereto and can be any application that can be installed in the mobile terminal 100.

The specific icon may be a graphical object, for example, text, web page, icon, digital image or animation. However, the graphical object is not limited thereto and can be any object that is able to be displayed to the user.

In S120, the controller 180 may receive a predetermined user manipulation for selecting a specific page indicator a plurality of page indicators corresponding to the plurality of pages respectively, while the specific page is displayed on the touch screen 151.

The predetermined user manipulation may be a user manipulation related to "page movement" of the specific icon, for example, a user manipulation executed on the indicators corresponding to the plurality of pages respectively. Here, the indicators corresponding to the plurality pages respectively may be a predetermined interface for intuitively discriminating the page currently displayed on the touch screen 151 from other pages that are not displayed on the touch screen 151.

In 130, the controller 180 may automatically move the specific icon of the specific page to another page in response to the predetermined user manipulation. The controller 180 can automatically move the specific icon according to the predetermined user manipulation without touching for drag and moving the specific icon to a target page, as shown in FIGS. 4A and 4B.

The manipulation of moving the specific icon to page corresponding to the specific page indicator of a plurality of the plurality page indicators according to the predetermined user manipulation performed on the specific page indicator has been explained.

Figure 6:
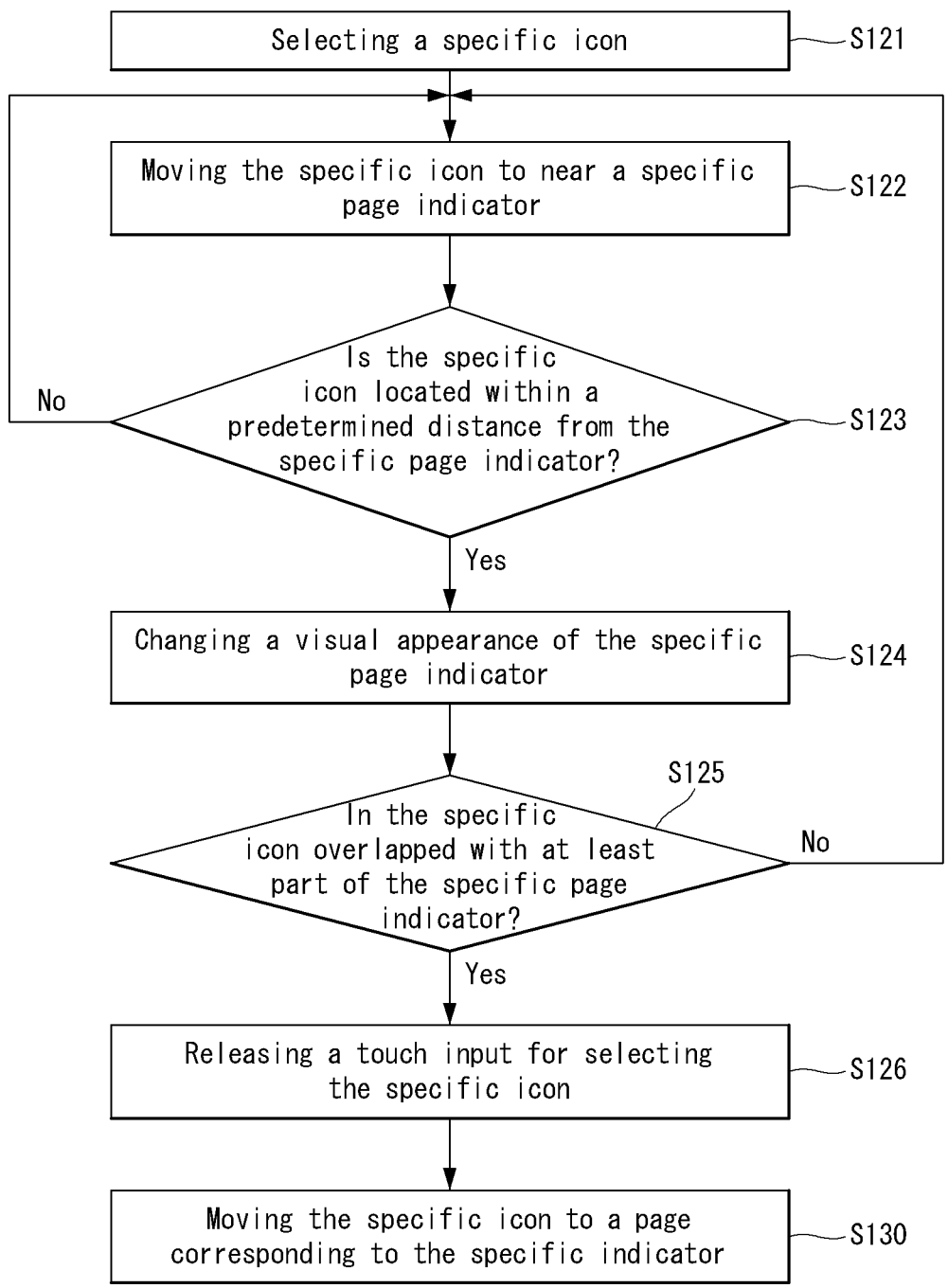
FIG. 6 is a flowchart illustrating the control method shown in FIG. 5 in more detail.

The predetermined user manipulation will now be described in more detail with reference to FIGS. 1 and 6. FIG. 6 is a flowchart illustrating the operation S120 shown in FIG. 5 in more detail. Hereinafter, the operation of the mobile terminal 100 to move a specific icon in response to the predetermined user manipulation performed on a specific page indicator is explained in detail with reference to FIGS. 1, 6, 7 and 10.

Referring to FIG. 6, in S121, the controller 180 may select a specific icon when a touch input for selecting the specific icon is received.

The touch input for selecting the specific icon may correspond to a 'tap' that touches a point of the touch screen 151, which corresponds to the specific icon, once for a short time. However, the touch input is not limited to the tap. For example, the touch input can include double tap, touch and hold, flicking, flick and hold, touch and move, drag and drop, etc. If the specific icon is related to executing for the function of an application, double tap applied to the specific icon may be a touch input for executing the application. Accordingly, the touch input in S121 may be a tap.

The manipulation of moving the specific icon in response to the predetermined user manipulation applied to the specific page indicator is explained with reference to FIGS. 7A, 7B, 7C and 7D.

In an implementation, the predetermined user manipulation may include a first touch input for selecting the specific icon and moving the specific icon to near the specific page indicator. Referring to FIG. 7A, when a first touch input 21 for dragging and moving a specific icon 2a to near a specific page indicator 203 is received, the controller 180 can move the specific icon 2a to near the specific page indicator 203 S122.

In an implementation, the manipulation of moving the specific icon to near the specific page indicator may be an manipulation of dragging and moving the specific icon to a point within a predetermined range (for example, within 5 pixels) from the specific page indicator (refer to FIG. 7A) or an manipulation of dragging and moving the specific icon and overlapping the specific icon with at least part of the specific page indicator.

The touch screen 151 may display a plurality of pages, and thus there is a plurality of page indicators corresponding to the plurality of pages respectively. Accordingly, the controller 180 may display the page indicators at specific intervals on the touch screen 151.

The specific icon displayed on the touch screen 151 may be larger than a single page indicator. In this case, even if the specific icon is moved to near one of the page indicators in response to the first touch input, an error may be generated when the controller 180 detects the page indicator corresponding to a page to which the specific icon will be moved due to a relatively narrow interval of the page indicators (refer to FIG. 7A).

Accordingly, in S123, the controller 180 may determine whether the specific icon approaches within a predetermined distance from the specific page indicator according to the first touch input. And in S124 the controller 180 can change the visual appearance of the specific page indicator to minimize the error and improve the visibility of the user.

Figure 7B:
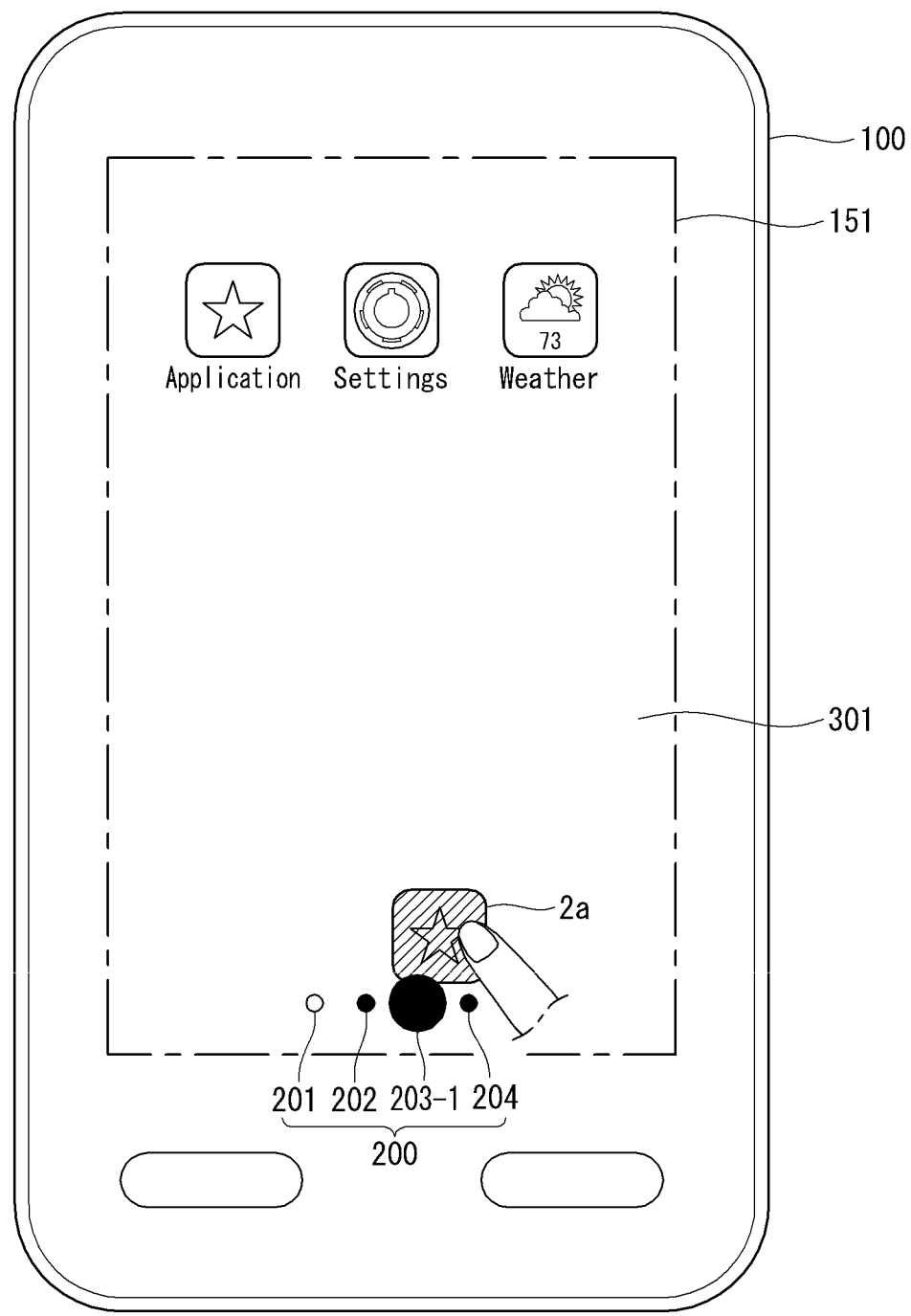

Referring to FIG. 7B, the controller 180 can enlarge the icon of the specific page indicator in response to the first touch input. In FIG. 7B, reference numeral 203-1 represents the enlarged specific page indicator. However, this document is not limited thereto. The visual appearance of the specific page indicator can be changed in various manners. Changing the visual appearance of the specific page indicator may include one of changing the size, color and shape of the specific page indicator, animating the specific page indicator, displaying specific text information related to the page corresponding to the specific page indicator on the specific page indicator and displaying a specific graphical object related to the page corresponding to the specific page indicator, as shown in FIGS. 8A, 8B, 8C and 8D.

The controller 180 can output a specific sound corresponding to the change in the visual appearance through the audio output unit.

FIGS. 8A, 8B, 8C and 8D are drawings illustrating examples of changing the visual appearance of the specific page indicator.

Figure 8A:
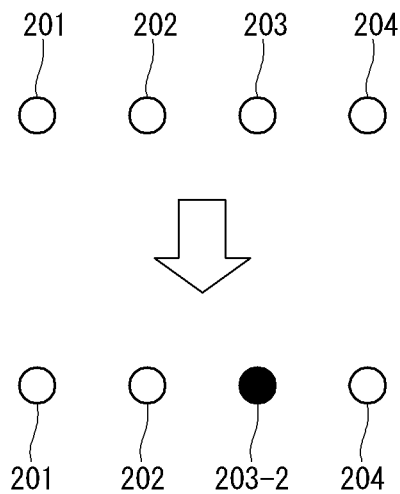
FIGS. 8A, 8B, 8C and 8D is a drawing illustrating examples of changing the visual appearance of a specific page indicator.

Referring to FIG. 8A, when the specific icon approaches within a predetermine distance from the specific page indicator 203-2, the controller 180 may display a specific page indicator 203-2 as an icon in a specific color on the touch screen 151.

Figure 8B:
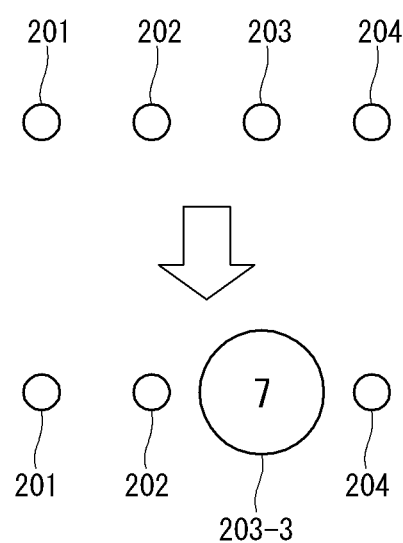
Figure 8C:
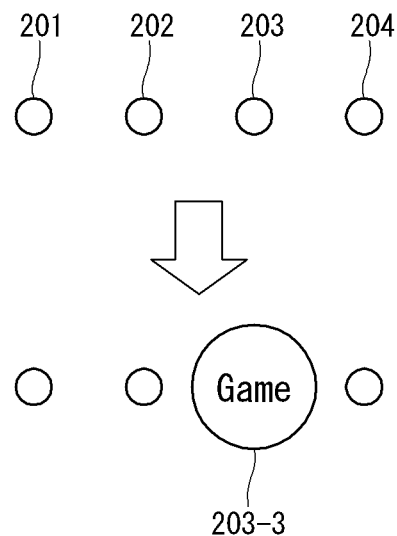

Referring to FIGS. 8B and 8C, the controller 180 may display an enlarged specific page indicator 203-3 including explanation information about the page corresponding to the specific page indicator on the touch screen 151. Explanation information "7" shown in FIG. 8B represents that the number of an application included in page 203-3 is seven. The explanation information "Game" shown in FIG. 8C represents that the theme of the page is "game". When the user of the mobile terminal 100 groups icons corresponding to a specific theme by pages and manages the grouped icons, the efficiency of icon management can be improved by displaying page explanation information on the page indicators.

Figure 8D:
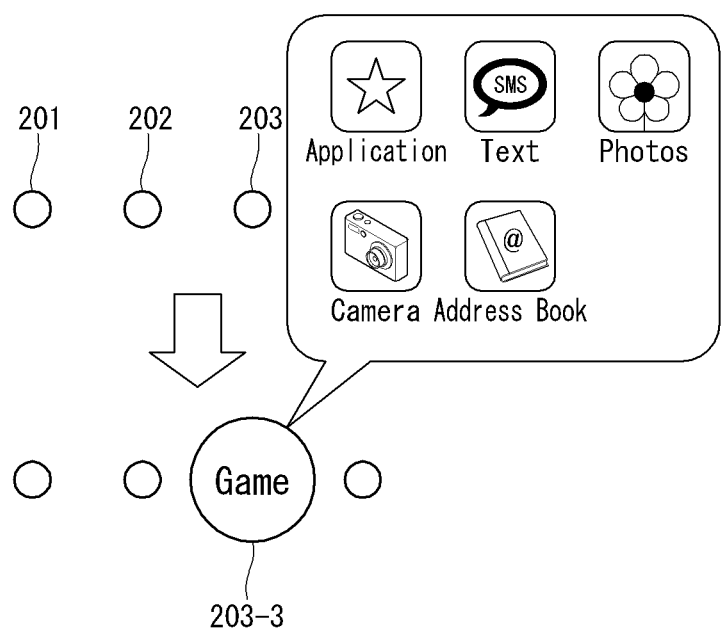

Referring to FIG. 8D, the controller 180 may display preview information of the corresponding page around the enlarged specific page indicator 203-3 including the page explanation information.

Referring back to FIG. 6, in S125 the controller 180 determines whether the specific icon is overlapped with at least part of the specific page indicator. And in S126, when the specific icon is overlapped with at least part of the specific page indicator, the controller 180 can move the specific icon to the page corresponding to the specific page indicator. And when a touch input for selecting the specific icon is released S130, the controller 180 can move the specific icon to a page corresponding to the specific indicator.

Figure 7C:
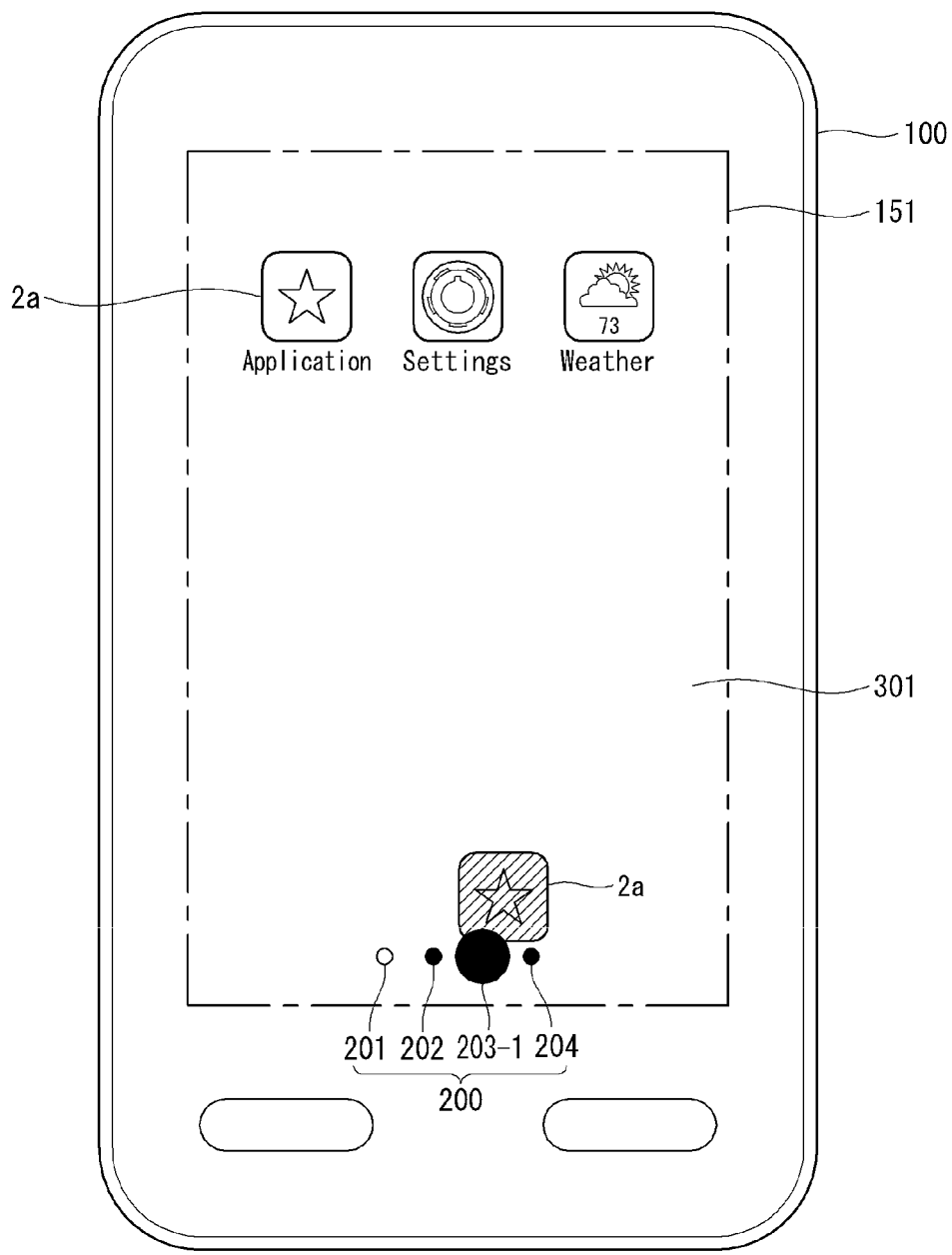

Referring to FIG. 7C, when the touching the specific icon 2a is released (for example, the user takes a finger off the touch screen 151) in a state of the specific icon 2a being overlapped with the specific page indicator 203-1, the controller 180 can move the specific icon 2a to the page 303 corresponding to the specific page indicator 203-1.

Here, the controller 180 may give a predetermined graphical effect to the specific icon 2a so as to display a visual effect of sucking the specific icon 2a into the specific page indicator 203-1. The visual effect is exemplary and various animated effects of making the specific icon 2a disappear from the current page 301 can be used.

Figure 7D:
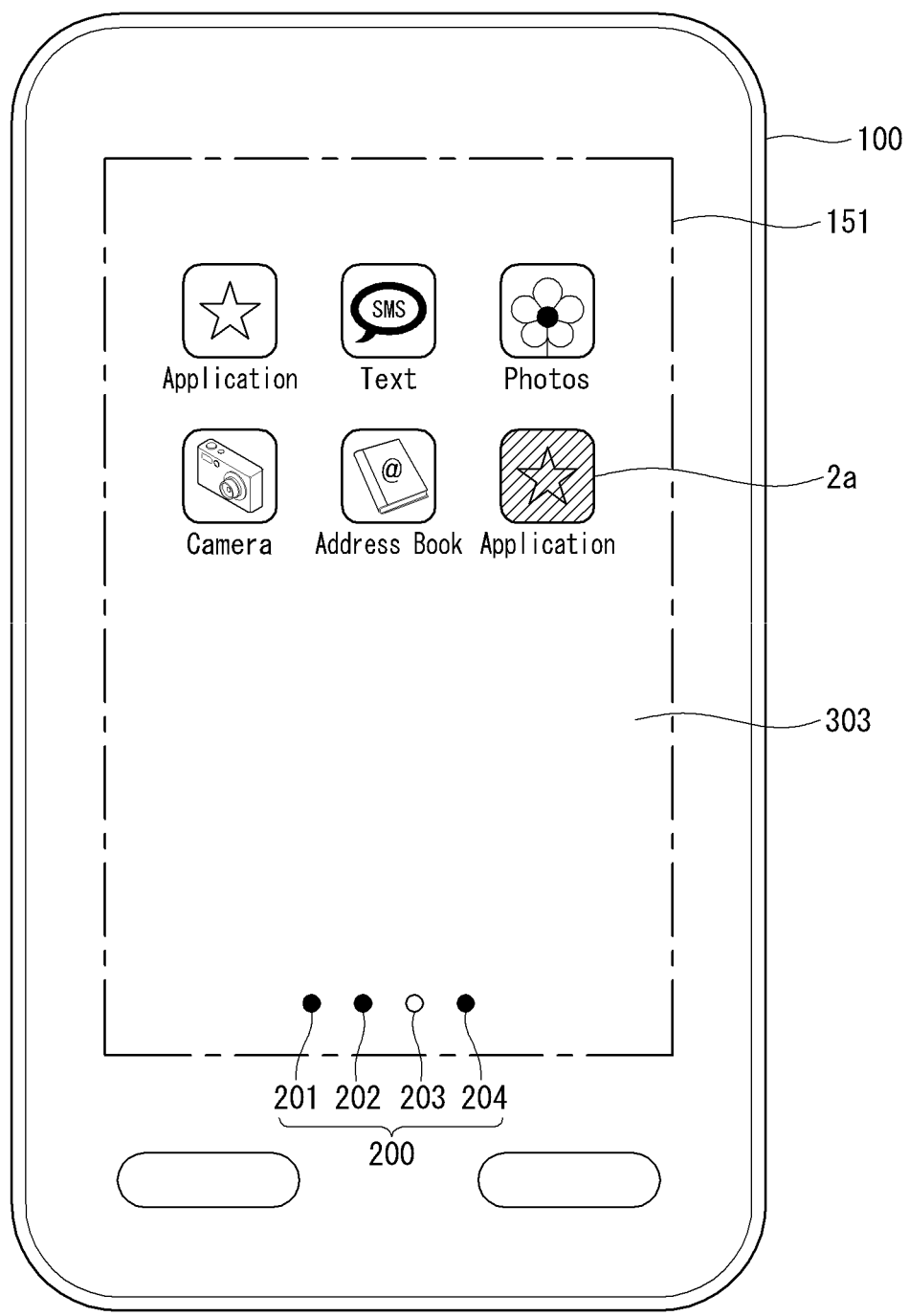

Referring to FIG. 7D, the controller 180 may display the page 303 to which the specific icon 2a has been moved on the touch screen 151 and locate the specific icon 2a next to icons displayed on the page 303. Accordingly, the controller 180 may change light and shade of the displayed page indicator 200. Specifically, the controller 180 may display the page indicator 203 corresponding to the page 303 in a bright color and display the page indicator 201 corresponding to the previous page 301 in a dark color.

The manipulation of moving a specific icon to near one of a specific page indicators and changing the visual appearance of the page indicator according to the icon movement result has been described with reference to FIGS. 7A, 7B, 7C and 7D.

The visual appearance of the specific page indicator can be not only statically changed, as described above, but also dynamically changed as the position of the specific icon varies. The manipulation of dynamically changing the visual appearance of the specific page indicator will now be explained with reference to FIG. 9.

FIG. 9 is a drawing illustrating changes in the visual appearances of page indicators during a page search manipulation.

The controller 180 may change the visual appearance of a specific page indicator 203 in response to a touch of making a specific icon 3a close to the specific page indicator 203 as shown in FIG. 9(a). When a touch of moving the specific icon 3a to a neighboring page indicator 204 is received while the touch of making the specific icon 3a close to the specific page indicator 203 is not cancelled, the controller 180 may return the visual appearance of the page indicator 203 to the original state and change the visual appearance of the neighboring page indicator 204, as shown in FIGS. 9(b) and 9(c).

Furthermore, the controller 180 may vary a degree of changing the visual appearance of a specific page indicator in proportion to the area a contact portion of the specific icon 3a and the specific page indicator. Since the area of the contact portion of the specific icon 3a and the page indicator 204, shown in FIG. 9(b), is larger than the area of the contact portion of the specific icon 3a and the page indicator 204, shown in FIG. 9(c), the controller 180 can control the size of the page indicator 204 such that the page indicator 204 shown in FIG. 9(c) is larger than the page indicator 204 shown in FIG. 9(b).

Accordingly, when a touch of moving the specific icon 3a between two page indicators in the state that the specific icon 3a is touched is received, the controller 180 can change the visual appearance of a page indicator corresponding to the specific icon 3a according to the movement of the specific icon 3a.

Figure 10:
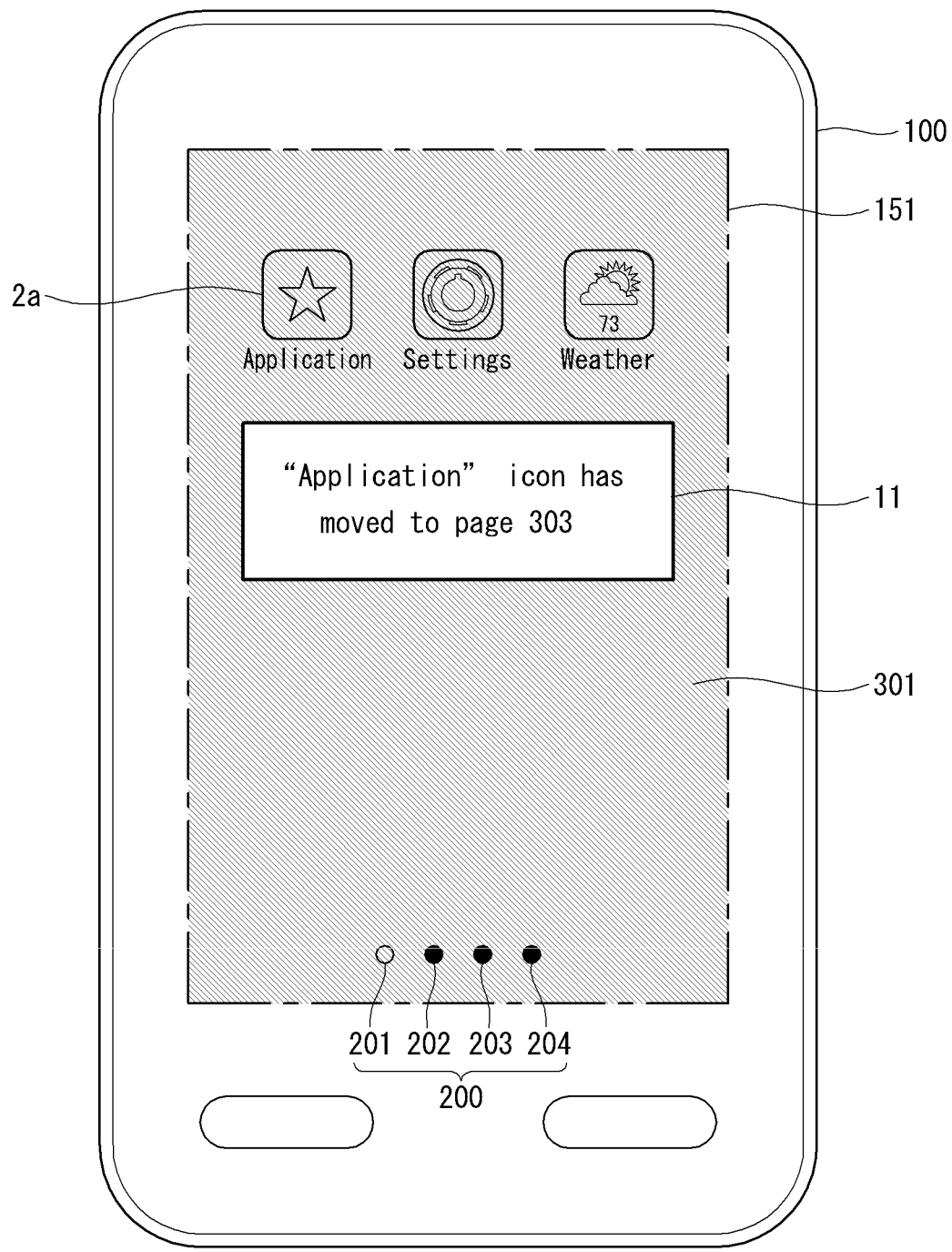
FIG. 10 is a drawing illustrating an exemplary screen of the mobile terminal displaying a message that informs a user of movement of a specific icon.

FIG. 10 is a drawing illustrating an exemplary screen of the mobile terminal 100 displaying a message 11 that informs the user of page movement of a specific icon.

Referring to FIG. 10, when the specific icon is moved, the controller 180 may display a page to which the specific icon has been moved on the touch screen 151, as shown in FIG. 7(c). In addition, the controller 180 may display the message 11 that informs the user that the specific icon 3a has been moved on the current page 301.

The embodiments of moving a specific icon in the state that the mobile terminal 100 does not enter a specific mode for reconfiguring an interface on the touch screen 151 as the mobile terminal 100 receives a signal corresponding to a predetermined user manipulation performed on a specific page indicator have been explained. Embodiments of entering an icon reconfiguration mode in a specific page on the touch screen 151 and moving a specific icon to a predetermined page will now be explained with reference to FIGS. 11 and 12.

Figure 11:
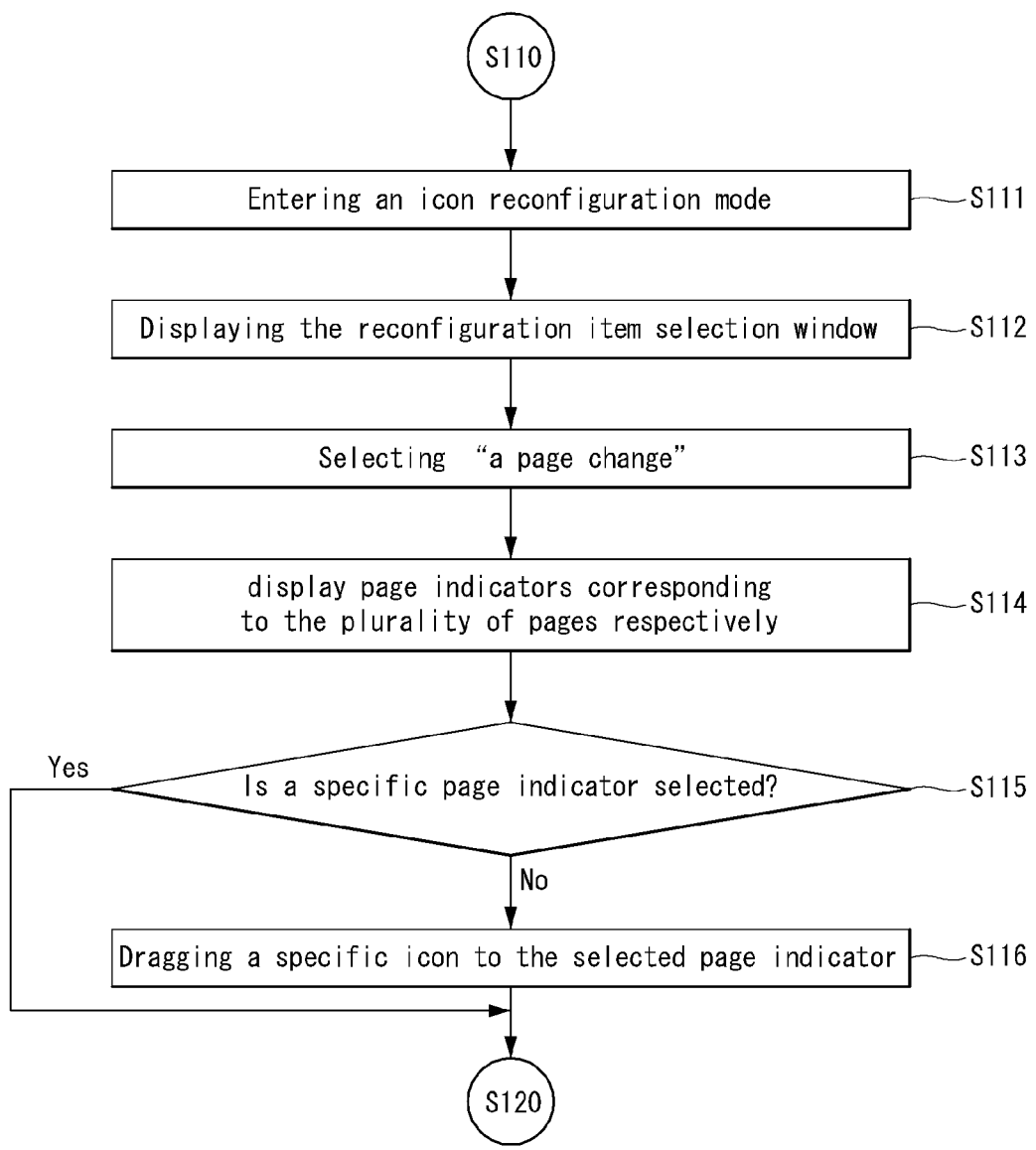
FIG. 11 is a flowchart illustrating a control method of the mobile terminal according to another embodiment of this document.

FIG. 11 is a flowchart illustrating a control method of the mobile terminal according to an embodiment of this document.

Referring to FIGS. 1, 5 and 11, in S110 the controller 180 may receive a first touch input for selecting a specific icon displayed on a specific page And in S111, the controller 180 may operate the mobile terminal 100 in the icon reconfiguration mode in response to the first touch input.

Here, the first touch input of operating the mobile terminal 100 in the icon reconfiguration mode may correspond to one of a long touch, double tap and proximity touch applied to the specific icon. However, this document is not limited thereto. For example, in a state that the specific icon is selected according to a touch input, the controller 180 can control the mobile terminal 100 to operate in the icon reconfiguration mode when receiving an input signal for selecting a soft button on the mobile terminal 100.

In S112, the controller 180 may display a reconfiguration item selection window 20 (shown in FIG. 12B), which can be controlled in the icon reconfiguration mode, on the touch screen 151 in response to the first touch input. When a touch input of selecting a page change item through the reconfiguration item selection window 20 is received S113, the controller 180 may display S114 page indicators corresponding to the plurality of pages respectively on the touch screen 151.

Figure 12A:
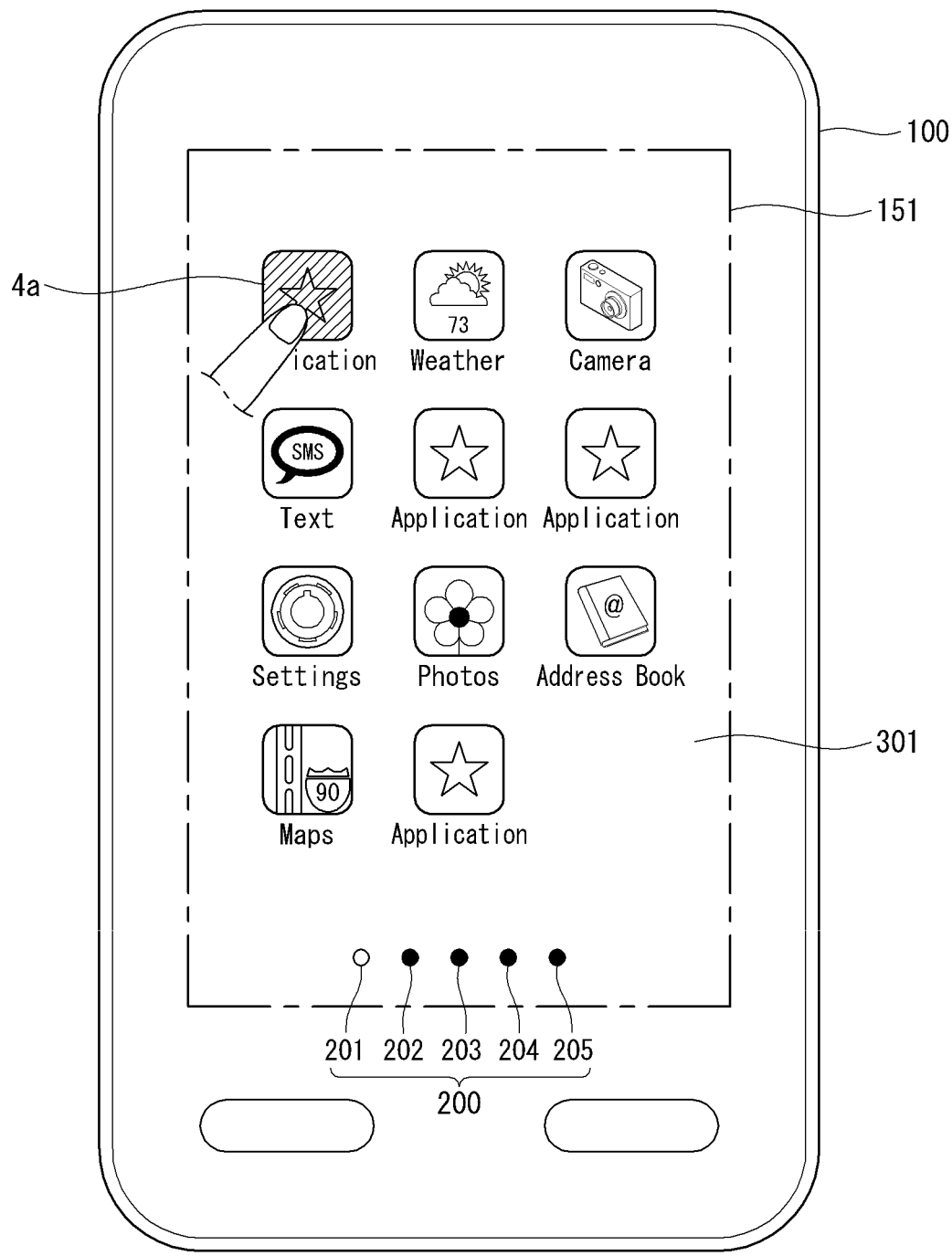
FIGS. 12A through 12F are drawings for explaining the control method shown in FIG. 11.
Figure 12B:
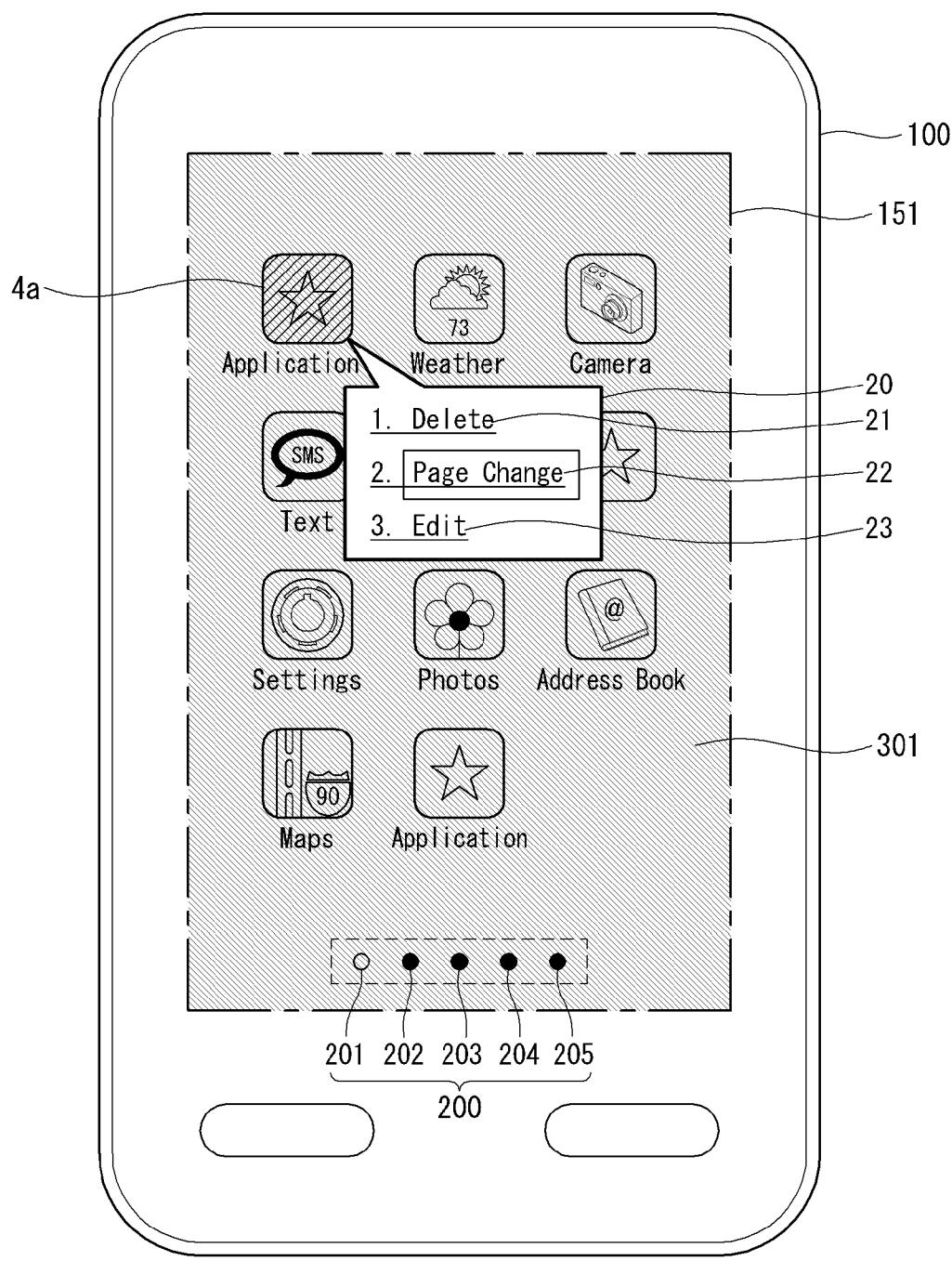

For example, when the first touch input applied to a specific icon 4a is received, as shown in FIG. 12A, the controller 180 can display the reconfiguration item selection window 20 on the touch screen 151 to control the mobile terminal 100 to operate in the icon reconfiguration mode, as shown in FIG. 12B. Here, reconfiguration items displayed in the reconfiguration item selection window 20 may include "icon delete" 21, "page change" 22 and "icon edit" 23. However, this document is not limited thereto.

Figure 12C:
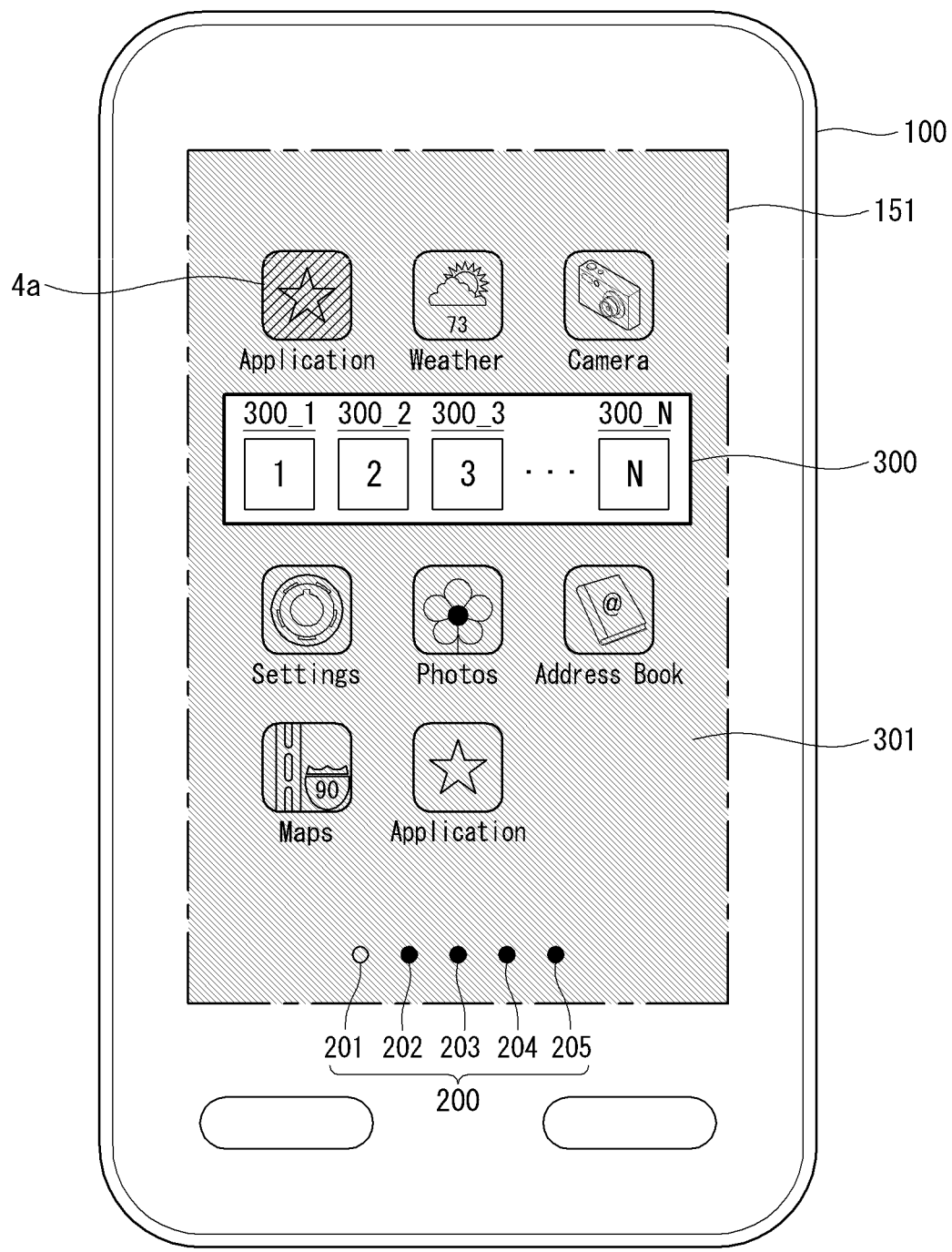

When a touch input of selecting the "page change" 22 from the reconfiguration items is received, the controller 180 can display a page indicator window 300 including page indicators 300_1, 300_2, 300_3, . . . 300_N respectively corresponding to pages on the touch screen 151, as shown in FIG. 12C. The controller 180 can visually differentiate the page indicator window 300 from other parts of the touch screen 151 by inactivating the idle screen of the mobile terminal 100 while displaying the page indicator window 300 on the touch screen 151.

The controller 180 may display Arabic numerals respectively indicating the pages of the page indicators included in the page indicator window 300. For example, the indicator 300_1 indicated by 1 represents the first page on the touch screen 151, the indicator 300_2 indicated by 2 represents the second page, and the indicator 300_3 indicated by 3 represents the third page in FIG. 12C.

Accordingly, when a predetermined user manipulation is performed on a specific page indicator corresponding to a page to which the specific icon 4a will be moved among the page indicators 300_1, 300_2, 300_3, . . . , 300_N in the icon reconfiguration mode, the controller 180 can move the specific icon 4a to the page corresponding to the selected page indicator.

Figure 12D:
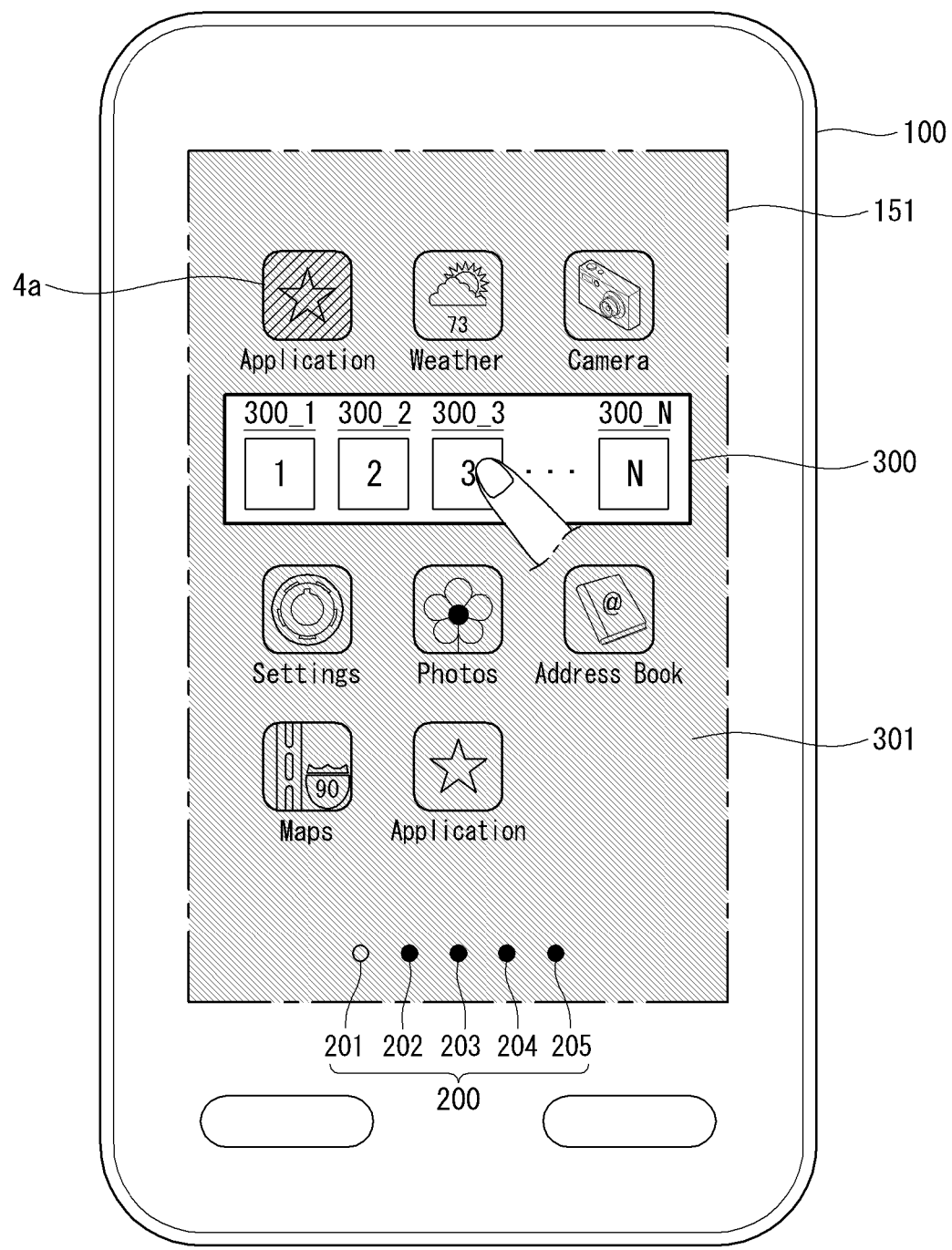

In an implementation, the predetermined user manipulation may correspond to a touch input of selecting a specific page indicator from the page indicators displayed on the touch screen 151. That is, the controller 180 can move the specific icon to the page corresponding to the specific page indicator when receiving a touch input of selecting the specific page indicator S115. For example, if the page indicator 303_3 indicated by 3 is selected when the mobile terminal 100 enters the icon reconfiguration mode by selecting the specific icon 4a, as shown in FIG. 12D, the specific icon 4a is moved to the page 303 (shown in FIG. 12F) corresponding to the page indicator 300_3. Meanwhile, the controller 180 can end the icon reconfiguration mode and move the specific icon at the same time when the touch input of selecting the specific page indicator is received.

Figure 12E:
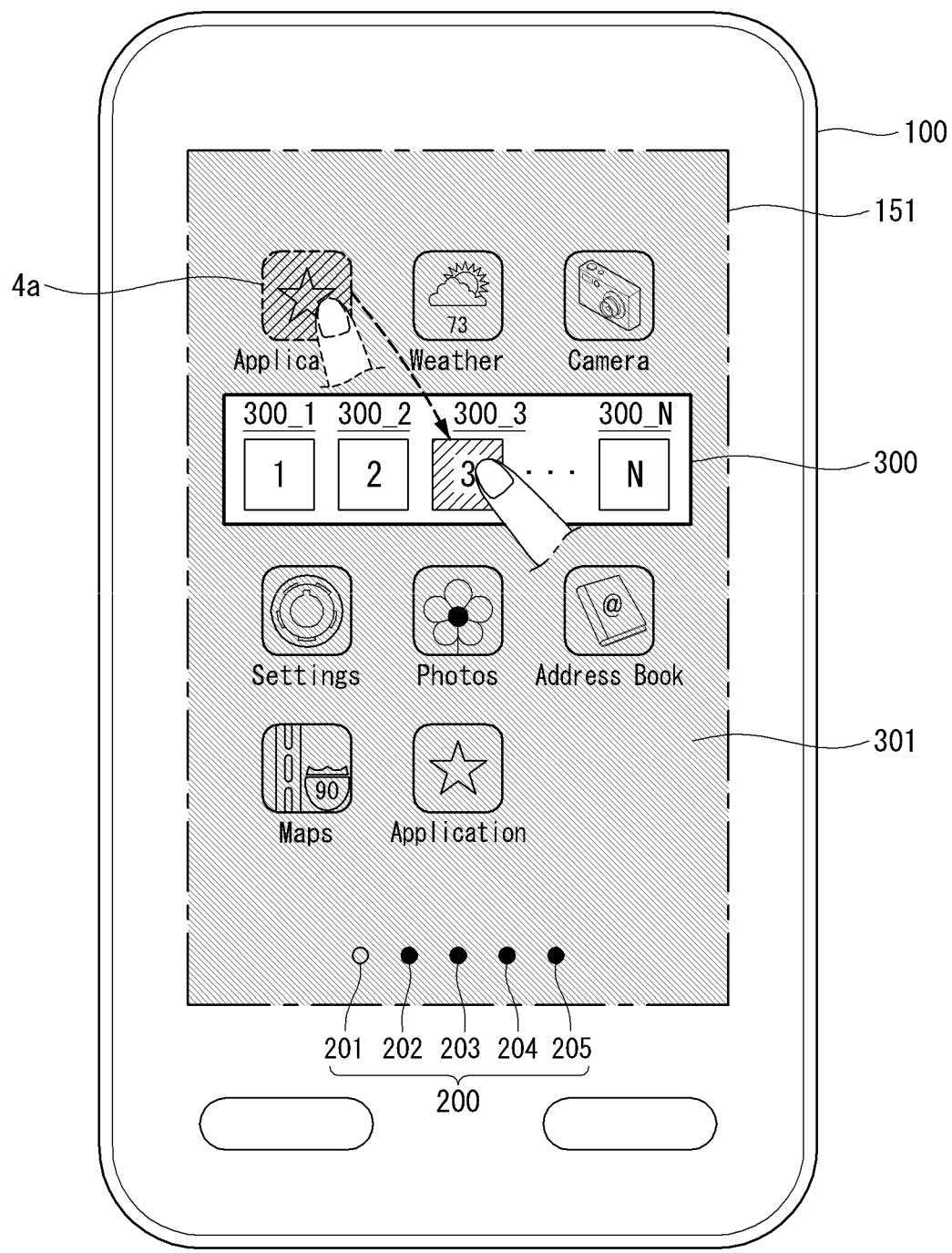

In an implementation, the predetermined user manipulation may correspond to a touch input of dragging and moving the specific icon to the specific page indicator. That is, when the controller 180 receives a touch input of dragging the specific icon to the specific page indicator S116, the controller 180 can move the specific icon to the page corresponding to the specific page indicator. For example, if the specific icon 4a is dragged and moved to the page indicator 303_3 indicated by 3 when the mobile terminal 100 enters the icon reconfiguration mode according to selection of the specific icon 4a, as shown in FIG. 12E, the specific icon 4a is moved to the page 303 (shown in FIG. 12F) corresponding to the page indicator 303_3. Moreover, the controller 180 can end the icon reconfiguration mode and move the specific icon at the same time when the touch input of dragging the specific icon to the specific page indicator is received.

Figure 12F:
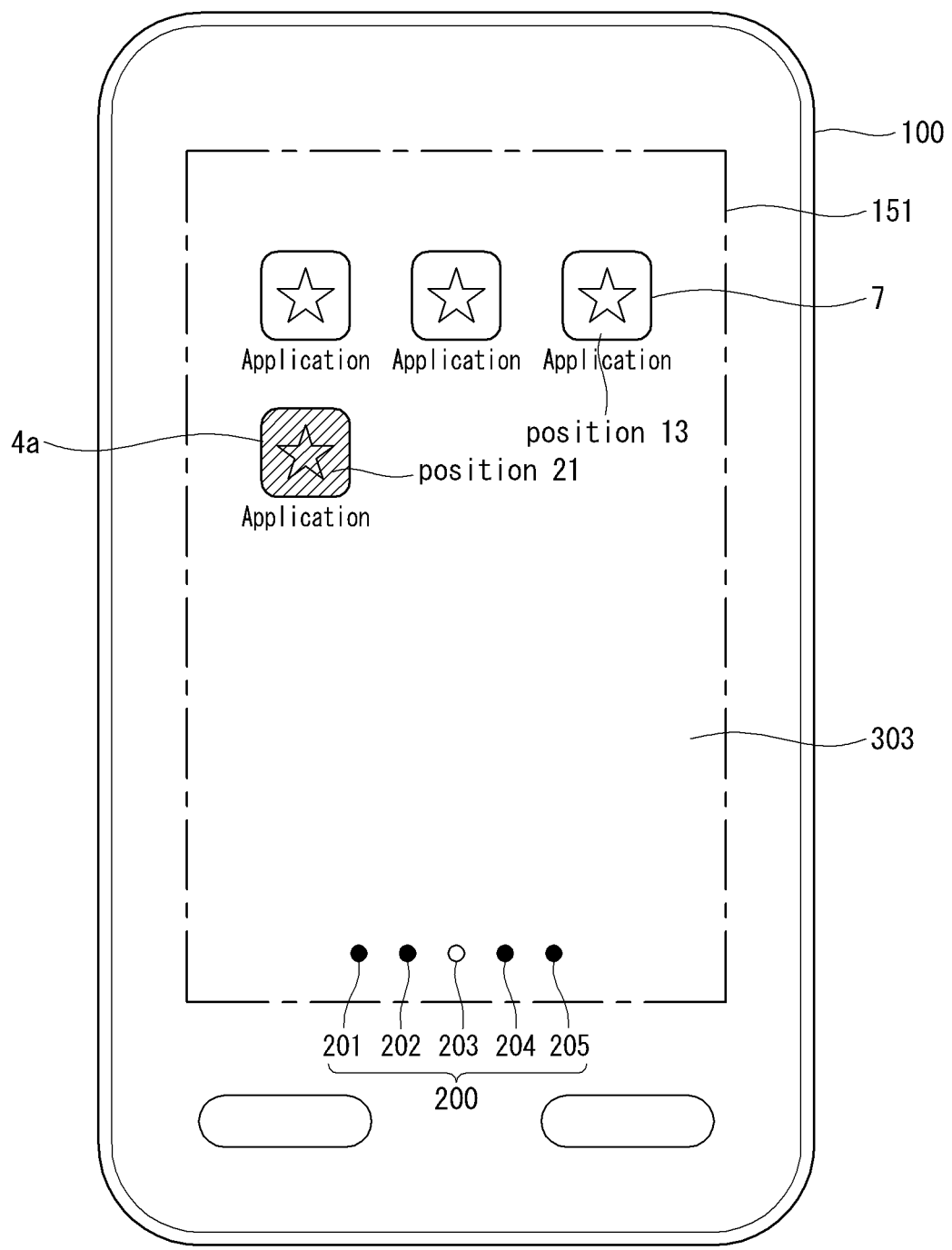

FIG. 12F illustrates an exemplary screen of the mobile terminal 100 displaying the result of page movement of the specific icon.

Referring to FIG. 12F, the specific icon 4a may be displayed at a specific position 21 in the page 303. The controller 180 may move the specific icon 4a to the page 303 and locate the specific icon 4a at the specific position 21 based on predetermined position information (previously set by the user). For example, an application icon 7 located at a position 13 can be moved to the position 21 and the specific icon 4a can be located at the position 13.

Furthermore, the controller 180 can correct the page indicators displayed at the bottom of the touch screen 151 such that the page indicators correspond to the current page 303 while displaying the page 303 to which the specific icon 4a has been moved on the touch screen 151.

The embodiments of moving a specific icon to a predetermined page in the icon reconfiguration mode have been explained. Particularly, the operation of displaying page indicators with improved visibility and accessibility such that one of the page indicators can be easily selected so as to move a specific icon displayed on a specific page to another page has been described. A control method of the mobile terminal to provide page indicators with improved visibility and accessibility so as to move a specific icon to a predetermined page more conveniently will now be explained with reference to FIGS. 13 and 14.

FIG. 13 is a drawing illustrating an example of page indicators 201, 202, 203, 204 and 205 displayed on the touch screen 151.

Referring to FIG. 13, the page indicators 201, 202, 203, 204 and 205 may be enlarged and displayed on the touch screen 151. In the icon reconfiguration mode, the page indicators 201, 202, 203 and 204 may be displayed in a scaled size 410. For example, the page indicators 201, 202, 203, 204 and 205 displayed at the bottom of the touch screen 151 can be enlarged 200% and displayed in a predetermined region (for example, the center) of the touch screen 151. Accordingly, the page indicator 201 corresponding to the current page 301 can be displayed as a page indicator 401 with improved visibility and accessibility.

When one of the page indicators displayed in the scaled size is selected and a specific icon is moved to the page corresponding to the selected page indicator, the controller 180 may end the icon reconfiguration mode and display the scaled page indicators in the original size.

Figure 14A:
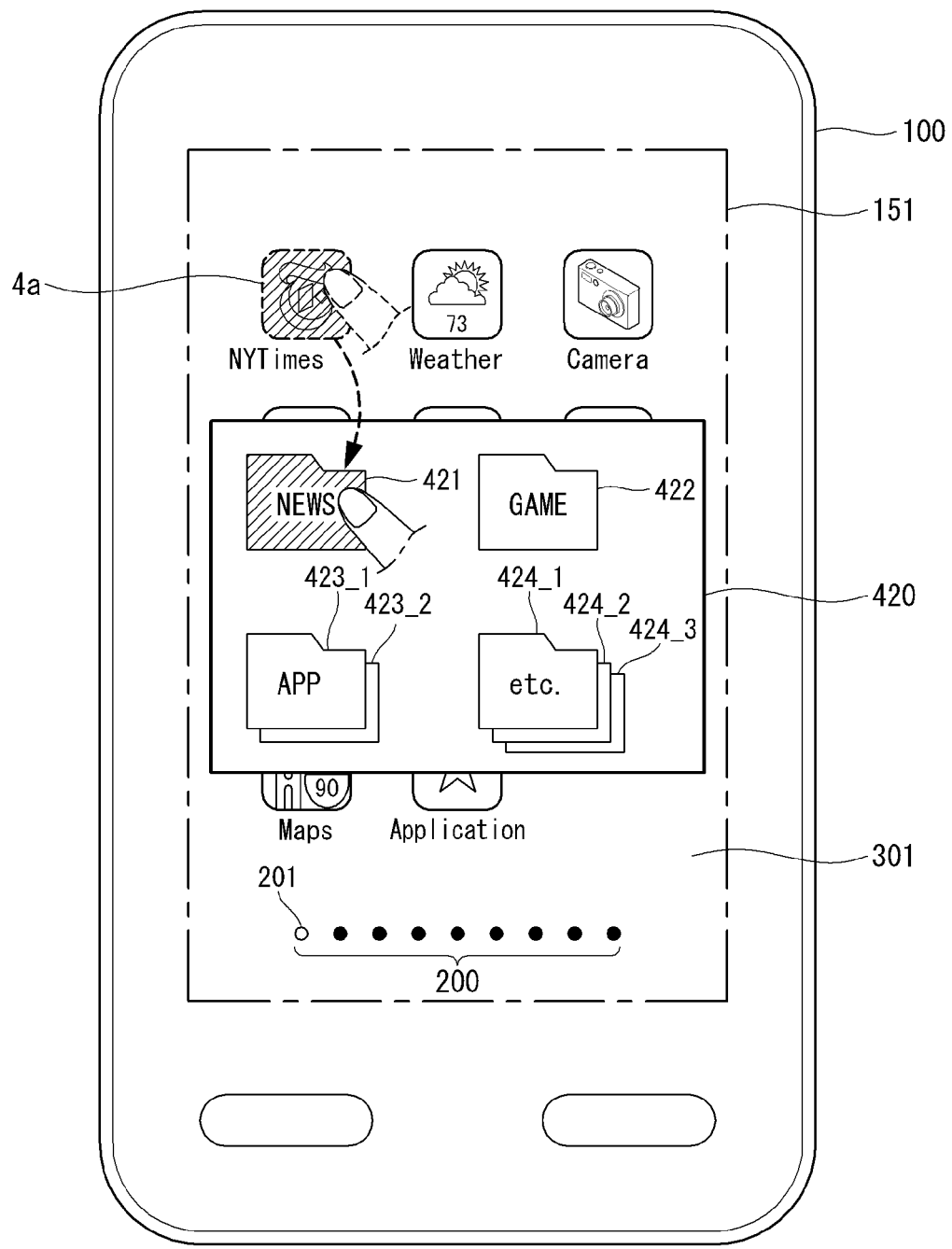
FIGS. 14A and 14B are drawings illustrating another example of page indicators displayed on the touch screen.
Figure 14B:
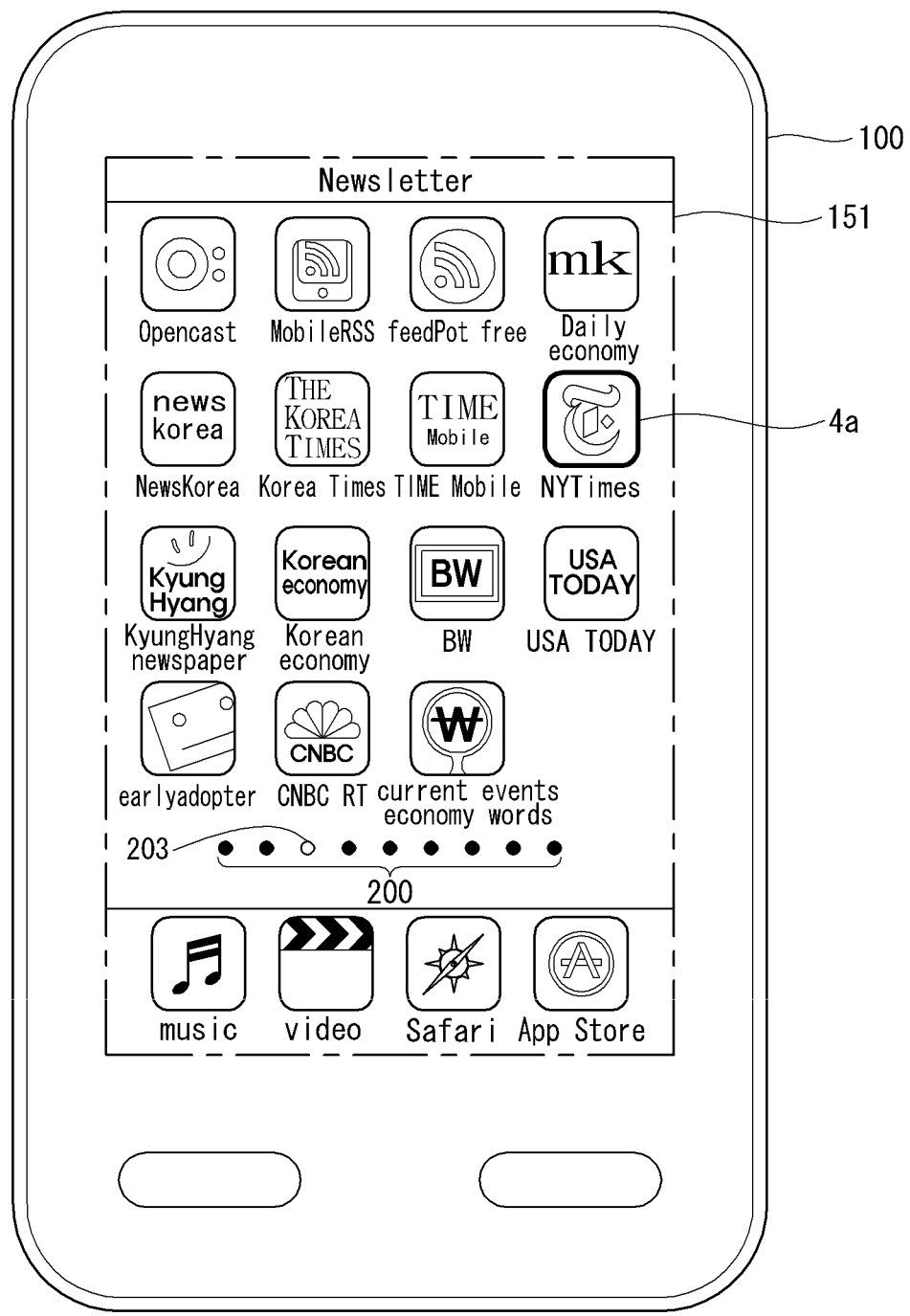

FIGS. 14A and 14B are drawings illustrating another example of page indicators displayed on the touch screen 151.

Referring to FIG. 14A, pages may be grouped by functions or themes and managed. For example, a newsletter page (shown in FIG. 14B) corresponding to a "News" page indicator 421 displays applications by which the user can view newspapers provided by domestic and foreign press. A game page corresponding to a "Game" page indicator 422 may display applications related to mobile games. If there are a plurality of page groups, "APP" page indicators 423_1 and 423_2 and "etc" page indicators 424_1, 424_2 and 424_3 may be displayed in a superposing manner on the touch screen 151.

Accordingly, when a user manipulation for entering the icon reconfiguration mode is performed on a "NYT News" application icon 4a displayed on a specific page 301, the controller 180 may display page indicators 420 grouped according to specific functions or specific themes on the touch screen 151.

When a drag-and-touch for moving the "NYT News" application icon 4a to the "News" page indicator 421 is performed, the controller 180 may move the "NYT News" application icon 4a to the Newsletter page shown in FIG. 14B.

Page indicators that can be provided to move a specific icon to a specific page are not limited to those shown in FIGS. 13 and 14. For example, the page indicators can include page identifying icons, folders including preview information about icons displayed on the pages, graphical objects related to the pages and a combination of them.

The above-described method of controlling the mobile terminal may be written as computer programs and may be implemented in digital microprocessors that execute the programs using a computer readable recording medium. The control method of the mobile terminal may be executed through software. The software may include code segments that perform required tasks. Programs or code segments may also be stored in a processor readable medium or may be transmitted according to a computer data signal combined with a carrier through a transmission medium or communication network.

The computer readable recording medium may be any data storage device that can store data that can be thereafter read by a computer system. Examples of the computer readable recording medium may include read-only memory (ROM), random-access memory (RAM), CD-ROMs, DVD±ROM, DVD-RAM, magnetic tapes, floppy disks, and optical data storage devices. The computer readable recording medium may also be distributed over network coupled computer systems so that the computer readable code is stored and executed in a distribution fashion.

A mobile terminal may include a first touch screen configured to display a first object, a second touch screen configured to display a second object, and a controller configured to receive a first touch input applied to the first object and to link the first object to a function corresponding to the second object when receiving a second touch input applied to the second object while the first touch input is maintained.

Any reference in this specification to "one embodiment," "an embodiment," "example embodiment," etc., means that a particular feature, structure, or characteristic described in connection with the embodiment is included in at least one embodiment of this document. The appearances of such phrases in various places in the specification are not necessarily all referring to the same embodiment. Further, when a particular feature, structure, or characteristic is described in connection with any embodiment, it is submitted that it is within the purview of one skilled in the art to affect such feature, structure, or characteristic in connection with other ones of the embodiments.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A mobile terminal, comprising:
   a touchscreen; and
   a controller configured to:
     cause displaying on the touchscreen of a first page of a plurality of pages, the displayed first page including at least one icon and a plurality of page indicators including a first indicator and a second indicator, the first indicator corresponding to a second page of the plurality of pages that is not currently displayed, and the second indicator corresponding to the first page;
     in response to receiving a touch input applied on a first icon of the at least one icon, initiate an icon reconfiguration mode and cause enlarging of the plurality of page indicators, wherein each of the plurality of page indicators is enlarged and the second indicator is displayed distinguishably from others among the plurality of enlarged page indicators while the first page is displayed;
     in response to dragging of the first icon following the touch input, cause further enlarging of the enlarged first indicator when the dragged first icon overlaps a portion of the enlarged first indicator such that a size of the further enlarged first indicator is greatest among the plurality of page indicators; and
     cause displaying on the touchscreen of page information of the second page that corresponds to the first indicator within the displayed further enlarged first indicator, wherein the page information is not displayed within the first indicator prior to the initiation of the icon reconfiguration mode, and wherein the page information represents a number of icons included in the second page.

2. The mobile terminal of claim 1, wherein:
   the further enlarged size first indicator includes a defined boundary that is displayed on the touchscreen during the icon reconfiguration mode; and
   the defined boundary defines an area within which the page information is displayed.

3. The mobile terminal of claim 1, further comprising:
   a haptic device, and wherein the controller is further configured to cause the haptic device to provide vibration to indicate operation in the icon reconfiguration mode.

4. The mobile terminal of claim 1, wherein an animation results in the further enlarged size first indicator.

5. The mobile terminal of claim 1, further comprising:
   an audio output unit, wherein the controller is further configured to control the audio output unit to output a specific sound corresponding to the displaying of the further enlarged size first indicator.

6. The mobile terminal of claim 1, wherein the controller is further configured to:
   cause the touchscreen to terminate displaying of the first page; and
   cause the touchscreen to display the second page which corresponds to the first indicator,
   wherein the second page includes the first icon, which has been moved from the first page.

7. The mobile terminal of claim 1, wherein the touch input comprises a long touch, a double tap touch, or a proximity touch.

8. The mobile terminal of claim 1, wherein each of the plurality of page indicators includes at least page identification icons, folders including preview information about icons included in the corresponding page, or graphical objects related to the corresponding page.

9. The mobile terminal of claim 1, wherein the controller is further configured to:
   cause the touchscreen to further display a preview image of the second page corresponding to the first indicator in addition to the page information when the dragged first icon overlaps with the portion of the first indicator.

10. The mobile terminal of claim 1, wherein a degree of the enlargement of the first indicator is proportional to an area of the overlapped portion of the first indicator such that the further enlarged size of the first indicator varies based on a size of the area of the overlapped portion.

11. A method performed at a mobile terminal having a touchscreen, the method comprising:
    displaying on the touchscreen a first page of a plurality of pages, the displayed first page including at least one icon;
    displaying on the touchscreen a plurality of page indicators including a first indicator and a second indicator, the first indicator corresponding to a second page of the plurality of pages that is not currently displayed, and the second indicator corresponding to the first page currently displayed;
    in response to receiving a touch input applied on a first icon of the at least one icon, initiating an icon reconfiguration mode and causing enlarging of the plurality of page indicators, wherein each of the plurality of page indicators is enlarged and the second indicator is displayed distinguishably from others among the plurality of enlarged page indicators while the first page is displayed;

in response to dragging of the first icon following the touch input, causing further enlarging of the enlarged first indicator when the dragged first icon overlaps a portion of the enlarged first indicator such that a size of the further enlarged first indicator is greatest among the plurality of page indicators; and displaying on the touchscreen page information of the second page that corresponds to the first indicator within the displayed further enlarged first indicator, wherein the page information is not displayed within the first indicator prior to the initiation of the icon reconfiguration mode, and wherein the page information represents a number of icons included in the second page.

12. The method of claim 11, wherein:

the further enlarged size first indicator includes a defined boundary that is displayed on the display during the icon reconfiguration mode; and the defined boundary defines an area within which the page information is displayed.

13. The method of claim 11, further comprising:

providing vibration to indicate operation in the icon reconfiguration mode.

14. The method of claim 11, wherein an animation results in the further enlarged size first indicator.

15. The method of claim 11, further comprising:

outputting a specific sound corresponding to the displaying of the further enlarged size first indicator.

16. The method of claim 11, further comprising:

terminating the displaying of the first page; and displaying the page which corresponds to the first indicator, wherein the second page which corresponds to the first indicator includes the first icon, which has been moved from the first page.

17. The method of claim 11, wherein the touch input comprises a long touch, a double tap touch, or a proximity touch.

18. The method of claim 11, wherein each of the plurality of page indicators includes at least page identification icons, folders including preview information about icons included in the corresponding page, or graphical objects related to the corresponding page.

19. The method of claim 11, further comprising:

displaying a preview image corresponding to the first indicator in addition to the page information when the dragged first icon overlaps with the portion of the first indicator.

20. The method of claim 11, wherein a degree of the enlargement of the first indicator is proportional to an area of the overlapped portion of the first indicator such that the further enlarged size of the first indicator varies based on a size of the area of the overlapped portion.

* * * * *